United States Patent
Meng et al.

(10) Patent No.: US 10,978,709 B2
(45) Date of Patent: Apr. 13, 2021

(54) LITHIUM-EXCESS CATHODE MATERIAL AND CO-PRECIPITATION FORMATION METHOD

(71) Applicant: The Regents of the University of California, Oakland, CA (US)

(72) Inventors: Ying Shirley Meng, San Diego, CA (US); Minghao Zhang, La Jolla, CA (US); Haodong Liu, La Jolla, CA (US); Danna Qian, La Jolla, CA (US); Chengcheng Fang, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 135 days.

(21) Appl. No.: 15/774,876

(22) PCT Filed: Nov. 15, 2016

(86) PCT No.: PCT/US2016/062067
§ 371 (c)(1),
(2) Date: May 9, 2018

(87) PCT Pub. No.: WO2017/087403
PCT Pub. Date: May 26, 2017

(65) Prior Publication Data
US 2018/0331360 A1    Nov. 15, 2018

Related U.S. Application Data

(60) Provisional application No. 62/255,676, filed on Nov. 16, 2015, provisional application No. 62/343,469, filed on May 31, 2016.

(51) Int. Cl.
*H01M 4/525* (2010.01)
*H01M 4/505* (2010.01)
(Continued)

(52) U.S. Cl.
CPC ......... *H01M 4/525* (2013.01); *H01M 4/1391* (2013.01); *H01M 4/485* (2013.01);
(Continued)

(58) Field of Classification Search
None
See application file for complete search history.

(56) References Cited

U.S. PATENT DOCUMENTS 6,241,959 B1 * 6/2001 Cho ................ H01M 4/131
252/519.1
6,660,432 B2   12/2003 Paulsen et al.
(Continued)

FOREIGN PATENT DOCUMENTS

WO    2015035712 A1    3/2015

OTHER PUBLICATIONS

Armstrong et al., "Demonstrating oxygen loss and associated structural reorganization in the lithium battery cathode Li[Ni0.2Li0.2Mn0.6]O2" J. Am. Chem. Soc., vol. 128, pp. 8694-8698, 2006.
(Continued)

*Primary Examiner* — Wyatt P McConnell
(74) *Attorney, Agent, or Firm* — Greer, Burns & Crain, Ltd.; Steven P. Fallon

(57) ABSTRACT

A lithium-excess cathode material according to Li1+xNiaMnbCocModO2-y (0<x<0.3, 0≤a≤1, 0≤b≤1, 0≤c≤1, 0≤d≤0.2, 0≤y≤0.25) in the form of secondary spherical microparticles formed from primary spherical nanoparticles. The primary nanoparticles can in the range of ~130 nm to 170 nm and the secondary in the range of ~2-3 μm. A method of formation includes mixing a carbonates or hydroxides solution into a mixed solution of transition metal (M) ions with predetermined stoichiometry under stirring, and aging resulting transition metal carbonates or hydroxides at a predetermined temperature for period of time to produce
(Continued)

primary nanoparticles of a predetermined size. A gas-solid interface reaction to uniformly creating oxygen vacancies without affecting structural integrity of Li-excess layered oxides is also provided.

20 Claims, 18 Drawing Sheets

(51) Int. Cl.
  H01M 10/0525 (2010.01)
  H01M 4/485 (2010.01)
  H01M 4/1391 (2010.01)
  H01M 10/052 (2010.01)
(52) U.S. Cl.
  CPC ....... *H01M 4/505* (2013.01); *H01M 10/0525* (2013.01); *H01M 10/052* (2013.01)

(56) References Cited

U.S. PATENT DOCUMENTS

| 8,932,768 | B2 | 1/2015 | Park et al. |
| 2016/0226068 | A1* | 8/2016 | Xia ................. H01M 4/505 |

OTHER PUBLICATIONS

Bommel et al., "Analysis of the Growth Mechanism of Coprecipitated Spherical and Dense Nickel, Manganese, and Cobalt-Containing Hydroxides in the Presence of Aqueous Ammonia," Chemistry of Materials, vol. 21, pp. 1500-1503, 2009.
Chen et al., "Study on the synthesis-microstructure-performance relationship of layered Li-excess nickel-manganese oxide as a Li-ion battery cathode prepared by high-temperature calcination," Journal of Materials Chemistry A, vol. 1, pp. 10847-10856, 2013.
Fell et al., "Correlation between oxygen vacancy, microstrain, and cation distribution in lithium-excess layered oxides during the first electrochemical cycle," Chem. Mater., vol. 25, pp. 1621-1629, 2013.
Kang et al., "The effects of acid treatment on the electrochemical properties of $0.5Li_2MnO_3$-$0.5LiNi_{0.44}Co_{0.25}Mn_{0.31}O_2$ electrodes in lithium cells," J. Electrochem. Soc., vol. 153, A1186-A1192, 2006.
Koga et al., "Different oxygen redox participation for bulk and surface: A possible global explanation for the cycling mechanism of $Li_{1.20}Mn_{0.54}Co_{0.13}Ni_{0.13}O_2$", J. Power Sources, vol. 236, pp. 250-258, 2013.
Kubota et al., "Direct synthesis of oxygen-deficient $Li_2MnO_{3-x}$ for high capacity lithium battery electrodes," Journal of Power Sources, vol. 216, pp. 249-255, 2012.
Park et al., "Physical and electrochemical properties of spherical $Li_{1+x}(Ni_{1/3}Co_{1/3}Mn_{1/3})_{1-x}O_2$ cathode materials," Journal of Power Sources, vol. 177, pp. 177-183, 2008.
Qian et al., "Uncovering the roles of oxygen vacancies in cation migration in lithium excess layered oxides," Phys. Chem. Chem. Phys., vol. 16, pp. 14665-14668, 2014.
Qian et al., "Lithium Lanthanum Titanium Oxides: A Fast Ionic Conductive Coating for Lithium-Ion Battery Cathodes", Chemistry of Materials, vol. 24, No. 14, p. 2744, 2012.
Wang et al., "Growth mechanism of $Ni_{0.3}Mn_{0.7}CO_3$ precursor for high capacity Li-ion battery cathodes," Journal of Materials Chemistry, vol. 21, pp. 9290-9295, 2011.
Xu et al., "Identifying surface structural changes in layered Li-excess nickel manganese oxides in high voltage lithium ion batteries: A joint experimental and theoretical study," Energy Environ. Sci., vol. 4, pp. 2223-2233, 2011.
Thomas, International Search Report for Application No. PCT/US2016/062067, dated Feb. 3, 2017.

* cited by examiner

LITHIUM-EXCESS CATHODE MATERIAL AND CO-PRECIPITATION FORMATION METHOD

PRIORITY CLAIM AND REFERENCE TO RELATED APPLICATION

The application claims priority under 35 U.S.C. § 119 and all applicable statutes and treaties from prior U.S. provisional application Ser. No. 62/080,718, which was filed Nov. 17, 2015, and from prior U.S. provisional application Ser. No. 62/343,469, which was filed May 31, 2016.

STATEMENT OF GOVERNMENT INTEREST

This invention was made with government support under DE-EE0007744 and DE-AC02-05CH11231 awarded by the Department of Energy. The government has certain rights in the invention.

FIELD

A field of the invention is lithium ion batteries. The invention particularly concerns lithium-excess cathode materials and cathodes. Lithium batteries with cathodes of the invention have widespread application, from a variety of mobile device power applications to hybrid and electrically powered vehicles. The invention particularly relates to non-aqueous rechargeable lithium and lithium ion electrochemical cells and batteries. Such cells can operate at ambient temperature. These rechargeable lithium and lithium ion cells and batteries may be used for many energy storage applications, including large-scale stationary electrical storage for the electrical grid. Other applications for lithium ion batteries include, but are not limited to portable device, transportation, defense products, and aerospace products.

BACKGROUND

Cathode materials with micrometer-sized spherical particles composed of nanoparticles are known to exhibit excellent electrochemical properties. Lithium transition metal layered oxide spherical particles can be prepared through a hydroxide or a carbonate co-precipitation process.

S. H Park et. al reported that $Li_{1+x}(Ni_{1/3}Co_{1/3}Mn_{1/3})_{1-x}O_2$ cathode materials synthesized by a conventional co-precipitation method using a continuously stirred tank reactor can improve both physical and electrochemical performance to a large extent. "Physical and electrochemical properties of spherical $Li_{1+x}(Ni_{1/3}Co_{1/3}Mn_{1/3})_{1-x}O_2$ cathode materials," Journal of Power Sources, 177 (2008) 177-183. The publication reported a uniform, spherical morphology via a coprecipitation using a continuously stirred tank reactor method. The publication also reported a second synthesis route that involved the use of an $M_3O_4$ ($M=Ni_{1/3}Co_{1/3}Mn_{1/3}$) spinel compound, obtained from the carbonate $(Ni_{1/3}Co_{1/3}Mn_{1/3})CO_3$ precursor. The publication states that both $Li_{1+x}(Ni_{1/3}Co_{1/3}Mn_{1/3})_{1-x}O_2$ products were highly uniform, having a narrow particle size distribution (10-µm average particle size). This is attributed to the homogeneity and spherical morphology of the starting mixed-metal carbonate precursor.

A. Bommel et. al reported upon a growth mechanism of co-precipitated spherical and dense nickel, manganese, and cobalt-containing hydroxides, and the influence of aqueous ammonia on the co-precipitation reaction. "Analysis of the Growth Mechanism of Coprecipitated Spherical and Dense Nickel, Manganese, and Cobalt-Containing Hydroxides in the Presence of Aqueous Ammonia," Chemistry of Materials, 21 (2009) 1500-1503. The publication identifies the roles of pH, transition-metal type(s), and aqueous ammonia concentration as being most important in the synthesis of dense materials. Different pH ranges were identified for different metal hydroxides of $Ni(OH)_2$, $Ni_{1/2}Mn_{1/2}(OH)_2$, and $Ni_{1/3}Mn_{1/3}Co_{1/3}(OH)_2$. The publication attributed metal hydroxide particle growth to a dissolution-recrystallization type mechanism during synthesis.

D. Wang et. al reported upon a growth mechanism of co-precipitated spherical carbonate precursor for high capacity Li-ion battery cathodes and the pH zone that favors carbonate co-precipitation reaction. "Growth mechanism of $Ni_{0.3}Mn_{0.7}CO_3$ precursor for high capacity Li-ion battery cathodes," Journal of Materials Chemistry, 21 (2011) 9290-9295. The publication reported that Transition metal carbonate ($Ni_{0.3}Mn_{0.7}CO_3$) was co-precipitated as the precursor for Li- and Mn-enriched composite materials. An optimal pH range was reportedly determined based upon chemical equilibriums between the products and reactants. The publication reported that early stages of co-precipitation produced a nonhomogeneous particle size distribution and a nonhomogeneous chemical composition. The publication reported that about five hours were required for the co-precipitation to produce homogenous particle size and distribution, albeit with particle sizes greater than 30 µm.

The above publications are illustrative of co-precipitation methods for production of lithium transition metal layered oxide spherical particles that can be prepared through a hydroxide or a carbonate co-precipitation process. Generally, these traditional co-precipitation methods require delicate control of the concentration of precursors and ammonium hydroxide to obtain homogenous spherical precursors, and many only produce 20 or 30 µm or larger sized particles. The large particle size, however, may introduce several kinetic limitations during initial activation. In addition, such large size particles can crack during an initial charging process or during discharge/recharge, leading to capacity and voltage degradation over extended cycling. See, e.g., Chen et al., "Study on the synthesis-microstructure-performance relationship of layered Li-excess nickel-manganese oxide as a Li-ion battery cathode prepared by high-temperature calcination," Journal of Materials Chemistry A, 1 (2013) 10847-10856. The publication reported that internal cracks within these large size particles form even before any electrochemical cycling, which causes cycling degradation and might be a common problem encountered in the conventional precipitation-calcination process.

Additionally, in Li-ion cathode materials, oxygen vacancies have been investigated as potentially playing a role in determining the material's electron and ion transport properties. See, e.g., Armstrong, A. R. et al. "Demonstrating oxygen loss and associated structural reorganization in the lithium battery cathode $Li[Ni_{0.2}Li_{0.2}Mn_{0.6}]O_2$," J. Am. Chem. Soc. 128, 8694-8698 (2006); Koga, H. et al., "Different oxygen redox participation for bulk and surface: A possible global explanation for the cycling mechanism of $Li_{1.20}Mn_{0.54}Co_{0.13}Ni_{0.13}O_2$", J. Power Sources, 236, 250-258 (2013). However, the introduction of high levels of oxygen vacancies by prior techniques is known to harm bulk material properties and provide less than high quality bulk material. Previous work by the inventors and collaborators has shown that oxygen vacancies generated during the high-potential electrochemical process can facilitate the migration and surface structural transformation of transition metals, finally leading to their potential degradation during extended cycles. Xu, B., Fell, C. R., Chi, M. & Meng, Y. S., "Identifying surface structural changes in layered Li-excess nickel manganese oxides in high voltage lithium ion batteries: A joint experimental and theoretical study," Energy Environ. Sci. 4, 2223-2233 (2011); Fell, C. R. et al., "Correlation between oxygen vacancy, microstrain, and cation distribution in lithium-excess layered oxides during the first electrochemical cycle," Chem. Mater. 25, 1621-1629 (2013); Qian, D., Xu, B., Chi, M. & Meng, Y. S., "Uncovering the roles of oxygen vacancies in cation migration in lithium excess layered oxides," Phys. Chem. Chem. Phys. 16, 14665-14668 (2014). Previous publications have described creation of oxygen vacancies with a reducing atmosphere. Kubota, K. et al., "Direct synthesis of oxygen-deficient $Li_2MnO_{3-x}$ for high capacity lithium battery electrodes," Journal of Power Sources 216, 249-255 (2012). Other publications report use of leaching with acid accompanied by heat treatment. Kang, S. H., Johnson, C. S., Vaughey, J. T., Amine, K. & Thackeray, M. M., "The effects of acid treatment on the electrochemical properties of $0.5Li_2MnO_3$-$0.5LiNi_{0.44}Co_{0.25}Mn_{0.31}O_2$ electrodes in lithium cells,". J. Electrochem. Soc. 153, A1186-A1192 (2006). Bulk structures reported in our previous works and from other techniques to produce oxygen vacancies easily transforms from a pure layered phase to spinel- and/or rock-salt phases that immensely damages the rate capability and cycling stability.

SUMMARY OF THE INVENTION

An embodiment of the invention is a lithium-excess cathode material according to $Li_{1+x}Ni_aMn_bCO_cMo_dO_{2-y}$, ($0<x<0.3$, $0 \leq a \leq 1$, $0 \leq b \leq 1$, $0 \leq c \leq 1$, $0 \leq d \leq 0.2$, $0 \leq y \leq 0.25$) in the form of secondary spherical microparticles formed from primary spherical nanoparticles. The primary nanoparticles can be in the range of ~130 nm to 170 nm and the secondary in the range of ~2-3 μm. A method of formation includes mixing a carbonates or hydroxides solution into a mixed solution of transition metal (M) ions with predetermined stoichiometry under stirring, and aging resulting transition metal carbonates or hydroxides at a predetermined temperature for period of time to produce primary nanoparticles of a predetermined size.

Particular preferred materials include $Li_{1.2}Ni_{0.2}Mn_{0.6}O_2$, $Li_{1.2}Ni_{0.136}Mn_{0.544}Co_{0.136}O_2$, $Li_{1.1}Ni_{0.2}Mn_{0.6}O_{1.95}$, $Li_{1.13}Ni_{0.3}Mn_{0.57}O_2$, $Li_{1.144}Ni_{0.136}Co_{0.136}Mn_{0.544}O_{1.92}$, and $Li_{1.18}Ni_{0.135}Co_{0.135}Mn_{0.539}Mo_{0.01}O_2$. Preferred materials can also include a lithium lanthanum titanium oxide coating. Preferred methods can introduce and preferred materials can include excess oxygen vacancies.

DETAILED DESCRIPTION OF THE PREFERRED EMBODIMENTS

Figure 1:
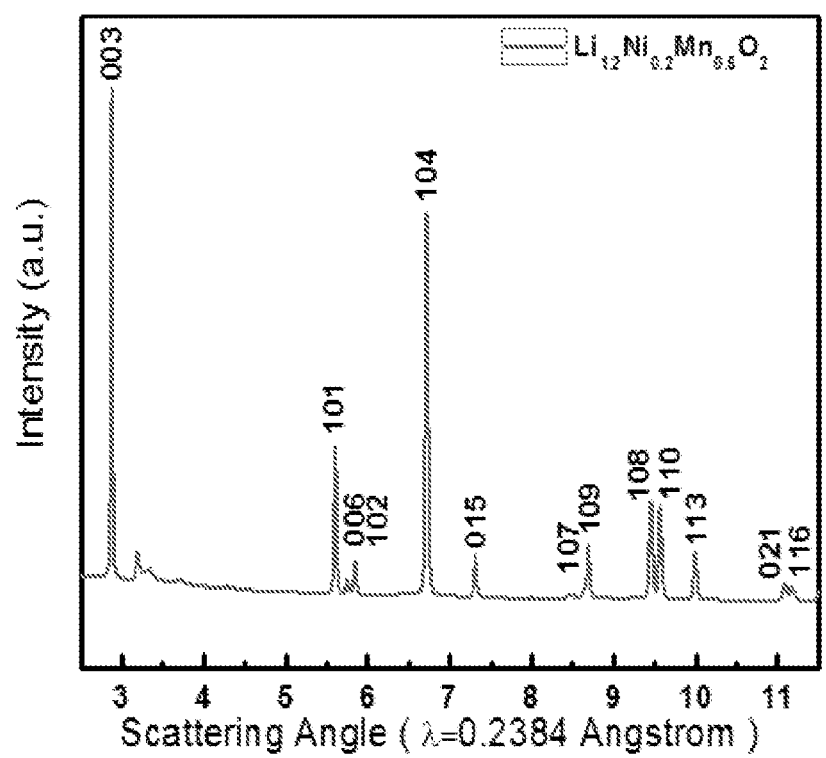
FIG. 1 is an XRD pattern of a sample $Li_{1.2}Ni_{0.2}Mn_{0.6}O_2$ synthesized by a preferred co-precipitation method of the invention.

Preferred embodiments provide lithium-excess cathode materials and co-precipitation fabrication methods. Preferred cathode materials are morphology-controlled lithium-excess materials $Li_{1+x}Ni_aMn_bCO_cMo_dO_{2-y}$ ($0<x<0.3$, $0 \leq a \leq 1$, $0 \leq b \leq 1$, $0 \leq c \leq 1$, $0 \leq d \leq 0.2$, $0 \leq y \leq 0.25$) with or without oxygen vacancies. The cathode materials are well-suited for use as lower-cost, high energy density cathodes for lithium ion batteries. Present materials have potential to increase the overall energy density of state-of-the-art lithium ion batteries by 20-25%. Preferred co-precipitation methods do not require aqueous ammonia addition during the formation process. Preferred methods provide lithium-excess material with uniform spherical morphology. Morphology-controlled lithium-excess material of the invention shows improved cycling ability and minimized voltage degradation compared to prior comparable materials known to the inventors. No cracking of the materials was observed.

Preferred embodiments further provide advantageous oxygen vacancies without affecting bulk properties. Preferred fabrication methods provide Li-ion cathode materials with stoichiometries characterized by oxygen vacancies that lead to improved electron and ion transport properties. Electron energy loss spectroscopy (EELS) mapping reveals oxygen vacancies have been successfully introduced on the 0-20 nm of the surface without a noticeable interruption in the bulk-structure. Electrochemical measurements prove that surface oxygen vacancies introduction in Li excess cathodes without severe structural destruction has a considerable effect on improving electrochemical performance.

A preferred co-precipitation method includes: An appropriate amount of carbonates or hydroxides was dissolved in deionized water to produce the desired particular compound in accordance with molar ratios to achieve that compound, and then added into a mixed solution of transition metal (M) ions with appropriate stoichiometry under stirring. An appropriate amount can be determined by the transition metal solution concentration. An equal concentration for carbonates and double concentration for hydroxides compared with transition metal concentration is used in preferred embodiments. The resulting transition metal carbonates or hydroxides was transferred to Teflon lined stainless steel autoclave, and then aged at selected temperature (ranging from 40° C. to 80° C.) for suitable period of time (e.g. 2 to 20 hours). Thereafter, the resulting powder was washed, dried and then mixed with a stoichiometric amount of lithium carbonate or lithium hydroxide, followed by calcination at selected temperature (ranging from 400° C. to 1000° C.) for suitable period of time (e.g. 6 to 40 hours).

The obtained sample is phase pure lithium-excess material (which can be indexed as a hexagonal α-NaFeO$_2$ structure) confirmed by XRD spectrum. Sharp reflections in the XRD patterns reveal the high crystallinity of the sample. The obtained material has spherical morphology with excellent dispersion. The secondary particles are dense, and have an average diameter of approximately 2-3 μm. These secondary spherical particles consist of primary particles with particle size of ~130 nm to 170 nm and preferably approximately 150 nm.

When charged and discharged at a rate of 0.05 C between 2.0 V and 4.8 V, one sample of this invention can deliver a discharge capacity of about 250 mA h g$^{-1}$. Compared with the sample without morphology control, the morphology control sample not only shows a large discharge capacity at the first cycle, but also it exhibits almost the same capacity and voltage curve at the 80th cycle, which shows the preferred co-precipitation method may be promising for resolving the problem of the capacity and voltage fading during cycling of lithium-excess materials.

Since preferred cathodes are rich in manganese, they are expected to be low in cost compared to similar lithium metal oxide compounds, and exhibit high power, high energy, and long cycle life times.

In a preferred embodiment, $Li_{1.2}Ni_{0.2}Mn_{0.6}O_2$ (0.5 $LiNi_{0.5}Mn_{0.5}O_2$·0.5 $Li_2MnO_3$) is first obtained due to its high reversible discharge capacity (250 mAh g$^{-1}$) as well as relatively lower price (compare to Co containing materials). To make uniform spherical $Li_{1.2}Ni_{0.2}Mn_{0.6}O_2$ sample, precursor particles $(Ni_{0.25}Mn_{0.75})CO_3$ with homogenous composition were first synthesized via a preferred co-precipitation method.

In a preferred method, an appropriate molar amount of $Li_2CO_3$ (the molar ratio of carbonate ions to transitional metal ions is preferably 1:1, and within 1.05:1 to 1:1) was dissolved in 60 mL deionized water, and then added dropwise into 10 ml of a mixed solution of $Ni(NO_3)_2$ and $Mn(NO_3)_2$ (Ni:Mn=1:3 in molar ratio) under stirring. The resulting slurry was transferred to 100 mL Teflon lined stainless steel autoclave, and then aged at 80° C. for 12 h, the resulting $(Ni_{0.25}Mn_{0.75})CO_3$ precursor was washed several times by pure water to remove residual Li$^+$, and dried in a vacuum oven at 80° C. over night. For secondary particles of a predetermined 2-3 micrometer size, the aging should be conducted at 70 to 80° C. for 10 h to 15 h. For an arbitrary smaller predetermined size, the aging can be conducted from 40 to 80 C for 2 h to 20 h. Thereafter, the $(Ni_{0.25}Mn_{0.75})CO_3$ powder was mixed with a stoichiometric amount of $Li_2CO_3$, and was calcined at ~400-500° C., most preferably ~500° C. for ~3-7 h, most preferably ~5 h, in a 50 ml porcelain crucible, and then heated up to ~750-1000, most preferably ~900° C. and kept at this temperature for ~3-20 h, most preferably ~6 h followed by quenching in the air. This serves to calciante the powders to form a pure phase.

Experiments have obtained example materials with spherical morphology with micro-particle (secondary particle) sizes in the range of 2-3 μm are produced with the preferred calcination times and temperatures and with the aging process. These micro-spherical secondary particles are composed of a plurality of primary particles with diameters of about 150 nm on average, and are more generally ~130 nm to 170 nm.

A preferred embodiment provides a morphology controlled lithium excess material $Li_{1+x}Ni_aMn_bCo_cMo_dO_{2-y}$ (0<x<0.3, 0≤a≤1, 0≤b≤1, 0≤c≤1, 0≤d≤0.2, 0≤y≤0.25) as high energy density cathode for lithium ion batteries. This preferred lithium excess material with morphology control can be synthesized through a preferred co-precipitation method without any aqueous ammonia addition. The preferred material has spherical morphology with an average diameter of approximately ~3 μm. These secondary spherical particles consist of primary particles with particle size approximately 150 nm. The morphology controlled material can minimize voltage decay problem as well as improve capacity retention during cycling. The implementation of Li-excess materials in this invention as the cathode material in lithium ion batteries can increase the overall energy density of the state-of-the-art lithium ion batteries by 20-25%.

A preferred embodiment electrode is formed from an active material of composition $Li_{1.2}Ni_{0.2}Mn_{0.6}O_2$ (0.5 $LiNi_{0.5}Mn_{0.5}O_2$·0.5 $Li_2MnO_3$). In a preferred formation method, precursor particles $(Ni_{0.25}Mn_{0.75})CO_3$ with homogenous composition were first synthesized via a preferred co-precipitation method and aged to achieve the preferred secondary particle size. Thereafter, the $(Ni_{0.25}Mn_{0.75})CO_3$ powder was mixed with a stoichiometric amount of $Li_2CO_3$, and was calcined at 500° C. for 5 h in a 50 ml porcelain crucible, and then heated up to 900° C. and kept at this temperature for 6 h followed by quenching in the air. XRD has been used to confirm the obtained spherical sample is phase pure lithium-excess material. SEM images show the obtained precursor has spherical morphology with particle sizes in the range of 2-3 μm. These micro-spherical particles are composed of primary particles with diameters of about 150 nm on average. We have studied the effects of morphology control process on the electrochemical performance of $Li_{1.2}Ni_{0.2}Mn_{0.6}O_2$ cathode materials. When charged and discharged at a rate of 0.05 C between 2.0 V and 4.8 V, the sample can deliver a discharge capacity of about 250 mA h g$^{-1}$. Compared with the sample without morphology control, the morphology control sample not only shows a large discharge capacity at the first cycle, but also it exhibits almost the same capacity and voltage curve at the 80th cycle, which shows the preferred co-precipitation method may be promising for resolving the problem of the capacity and voltage fading during cycling of lithium-excess materials.

Morphology controlled lithium excess material $Li_{1+x}Ni_aMn_bCo_cMo_dO_{2-y}$ (0<x<0.3, 0≤a≤1, 0≤b≤1, 0≤c≤1, 0≤d≤0.2, 0≤y≤0.25) are provided as high energy density cathode for lithium ion batteries. This lithium excess material with morphology control is synthesized through a preferred co-precipitation method without any aqueous ammonia concentration control during the process, i.e., no aqueous ammonia needs to be added during the process.

In another preferred embodiment, $Li_{1.2}Ni_{0.136}Mn_{0.544}Co_{0.136}O_2$ is obtained following the synthesis protocol above. The difference is the molar ratios chosen, e.g., Ni:Mn:Co=1:4:1 in molar ratio in the precursor solution. Sharp reflections in the XRD patterns reveal the high crystallinity of the samples. SEM images for the $Li_{1.2}Ni_{0.136}Mn_{0.544}Co_{0.136}O_2$ powder synthesized by the preferred co-precipitation show the size of the primary particles increases to 200 nm due to the lithiation reaction and crystal growth, and the spherical morphology of the precursor is preserved at high temperature. Moreover, we note that the agglomeration of the grains for $Li_{1.2}Ni_{0.136}Mn_{0.544}Co_{0.136}O_2$ powder synthesized by our preferred method is controlled by aging in the sealed container, the time of which determines the size of the secondary particles that are formed and brings an improvement of the physical properties of the material. The sample $Li_{1.2}Ni_{0.136}Mn_{0.544}Co_{0.136}O_2$ synthesized by co-precipitation method shows a high discharge capacity (270 mAh/g) at 0.1 C rate and small irreversible capacity for the first cycle.

In another preferred embodiment, $Li_{1.1}Ni_{0.2}Mn_{0.6}O_{1.95}$ is obtained following the synthesis protocol described above with appropriate molar ratios of precursors. Sharp reflections in measured XRD patterns reveal the high crystallinity of the samples. SEM images for the $Li_{1.1}Ni_{0.2}Mn_{0.6}O_{1.95}$ show the spherical morphology of the precursor is preserved at high temperature. Moreover, we note that the agglomeration of the grains for $Li_{1.1}Ni_{0.2}Mn_{0.6}O_{1.95}$ powder synthesized by our preferred method is controlled by aging in the sealed container, which brings an improvement of the physical properties of the material.

In another preferred embodiment, morphology controlled $Li_{1.13}Ni_{0.3}Mn_{0.57}O_2$ was further coated with Lithium Lanthanum Titanium Oxides (LLTO) under different coating conditions in this experiment. These materials were made into Li coin cells. We compare the first cycle voltage profile of LNMO, #1 LLTO coated LNMO and #2 LLTO coated LNMO. The charge/discharge of first cycle were performed at 12.5 mA/g between 2V and 4.8V. The CE improved from 73.1% to 79.1% and 91.4%, respectively. To achieve the LLTO coating, $LiNO_3$/$LiCH_3COO$ (as lithium source), lanthanum nitrate hydrate ($La(NO_3)_3.xH_2O$) (as lanthanum source), and titanium(IV) butoxide ($Ti(OC_4H_9)O_4$)/$TiCl_4$ (as titanium source) were dissolved in ethanol or methanol or water. $NH_4OH$ solution was added to the solution to adjust the pH to 9 to 11. Li excess powder was then added to the coating solution. Then the whole solution was transferred to a Teflon-sealed autoclave under thermal treatment at 80 to 90° C. for 10 h to 15 h. The product was then dried at 100° C. under vacuum oven to remove residual water and subsequently calcined at 700 or 900° C. for 5 h to 10 h. The amount of LLTO is 1%-5 wt % of the Li excess material.

In another preferred embodiment, $Li_{1.144}Ni_{0.136}Co_{0.136}Mn_{0.544}O_{1.92}$ is obtained following the synthesis protocol described above with appropriate molar ratios of precursors. Sharp reflections in measured XRD patterns reveal the high crystallinity of the samples. SEM images for the $Li_{1.144}Ni_{0.136}Co_{0.136}Mn_{0.544}O_{1.92}$ show the spherical morphology of the precursor is preserved at high temperature. Moreover, we note that oxygen vacancies in the sample is determined by neutron diffraction (ND), a technique with high sensitivity for detecting light elements, such as Li and O. Electron energy loss spectroscopy (EELS) mapping reveals oxygen vacancies have been successfully introduced on the 0-20 nm of the surface without a noticeable interruption in the bulk-structure. Electrochemical measurements prove that surface oxygen vacancies introduction in Li excess cathodes without severe structural destruction has a considerable effect on improving electrochemical performance.

In another preferred embodiment, $Li_{1.18}Ni_{0.135}Co_{0.135}Mn_{0.539}Mo_{0.01}O_2$ is obtained following a the synthesis protocol described above with appropriate molar ratios of precursors. Sharp reflections in measured XRD patterns reveal the high crystallinity of the samples. SEM images for the $Li_{1.18}Ni_{0.135}Co_{0.135}Mn_{0.539}Mo_{0.01}O_2$ show the spherical morphology of the precursor is preserved at high temperature (~. Sample $Li_{1.18}Ni_{0.135}Co_{0.135}Mn_{0.539}Mo_{0.01}O_2$ synthesized by a preferred co-precipitation method shows a high discharge capacity (313 mAh/g) at 0.1 C rate and small irreversible capacity for the first cycle. Moreover, it exhibits almost the same capacity and voltage curve during cycling, which shows the preferred co-precipitation method with Mo doping holds promise for resolving the problem of the capacity and voltage fading during cycling of lithium-excess materials.

In additional preferred embodiments, lithium excess materials as described above are engineered to include oxygen vacancies. Preferred methods employ a gas-solid interface reaction to achieve delicate control of oxygen activity through uniformly creating oxygen vacancies without affecting structural integrity of Li-excess layered oxides, and thereby create lithium excess materials with uniform oxygen vacancies. Experiments showed that engineered lithium excess materials with uniform oxygen vacancies can deliver a discharge capacity as high as 301 mAh $g^{-1}$ with initial Coulombic efficiency of 93.2%. After 100 cycles, a reversible capacity of 300 mAh $g^{-1}$ still remains without any obvious decay in voltage. The methods demonstrate the ability to comprehensively design and control oxygen activity in layered oxide cathodes, which can greatly improve Li-ion batteries. In addition, the addition of oxygen vacancies via the methods of the invention does not affect the bulk properties of the Li excess material.

Preferred embodiments of the invention will now be discussed with respect to experiments. The experiments will be understood by artisans in view of the general knowledge in the art and the description that follows to demonstrate broader aspects of the invention.

Experiment 1

$Li_{1.2}Ni_{0.2}Mn_{0.6}O_2$ (0.5 $LiNi_{0.5}Mn_{0.5}O_2$.0.5 $Li_2MnO_3$) is first obtained due to its high reversible discharge capacity (250 mAh $g^{-1}$) as well as relatively lower price (compare to Co contained materials). To make uniform spherical $Li_{1.2}Ni_{0.2}Mn_{0.6}O_2$ sample, precursor particles $(Ni_{0.25}Mn_{0.75})CO_3$ with homogenous composition were first synthesized via a preferred co-precipitation method.

An appropriate amount of $Li_2CO_3$ (the molar ratio of carbonate ions to transitional metal ions is 1:1 (1.05:1 to 1:1 and the actual amount is based on transition metal solution concentration)) was dissolved in 60 mL deionized water, and then added dropwise into 10 ml of a mixed solution of $Ni(NO_3)_2$ and $Mn(NO_3)_2$ (Ni:Mn=1:3 in molar ratio) under stirring. The resulting slurry was transferred to 100 mL Teflon lined stainless steel autoclave, and then aged at 80° C. for 12 h, the resulting $(Ni_{0.25}Mn_{0.75})CO_3$ precursor was washed several times by pure water to remove residual $Li^+$, and dried in a vacuum oven at 80° C. over night. Thereafter, the $(Ni_{0.25}Mn_{0.75})CO_3$ powder was mixed with a stoichiometric amount of $Li_2CO_3$, and was calcined at 500° C. for 5 h in a 50 ml porcelain crucible, and then heated up to 900° C. and kept at this temperature for 6 h followed by quenching in the air.

XRD has been used to confirm the obtained spherical sample is phase pure lithium-excess material. The XRD pattern of the $Li_{1.2}Ni_{0.2}Mn_{0.6}O_2$ sample is shown in FIG. 1. Sharp reflections in the XRD patterns reveal the high crystallinity of the sample. All XRD peaks in the pattern can be indexed as a hexagonal $\alpha$-$NaFeO_2$ structure (space group: R-3m, NO. 166).

Figures 2A, 2B:
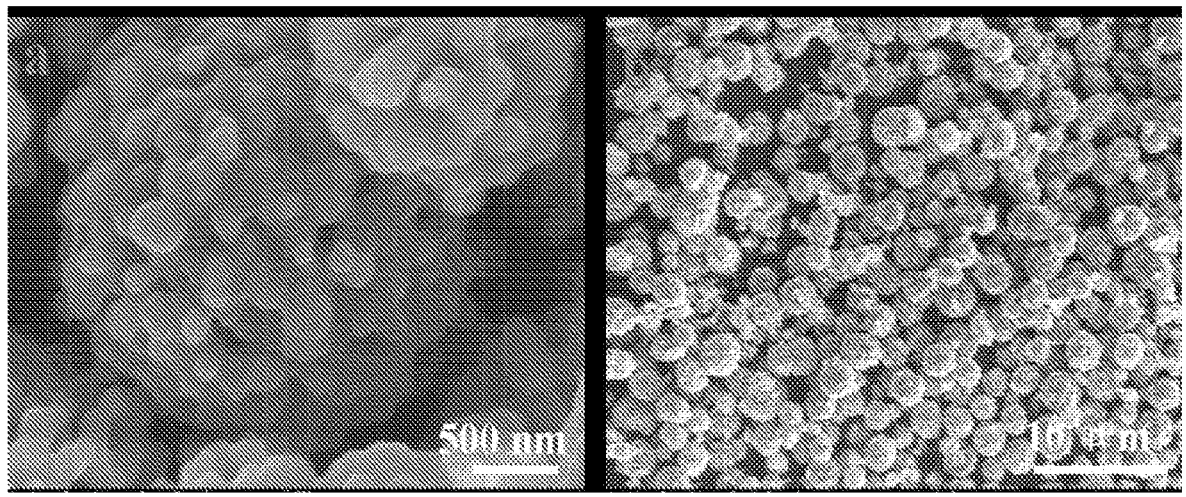
FIGS. 2A-2B are SEM images at different magnifications of sample $Li_{1.2}Ni_{0.2}Mn_{0.6}O_2$: synthesized by a preferred co-precipitation method of the invention and FIGS. 2C-2D of $Li_{1.2}Ni_{0.2}Mn_{0.6}O_2$: synthesized by conventional co-precipitation method without morphology control.
Figures 2C, 2D:
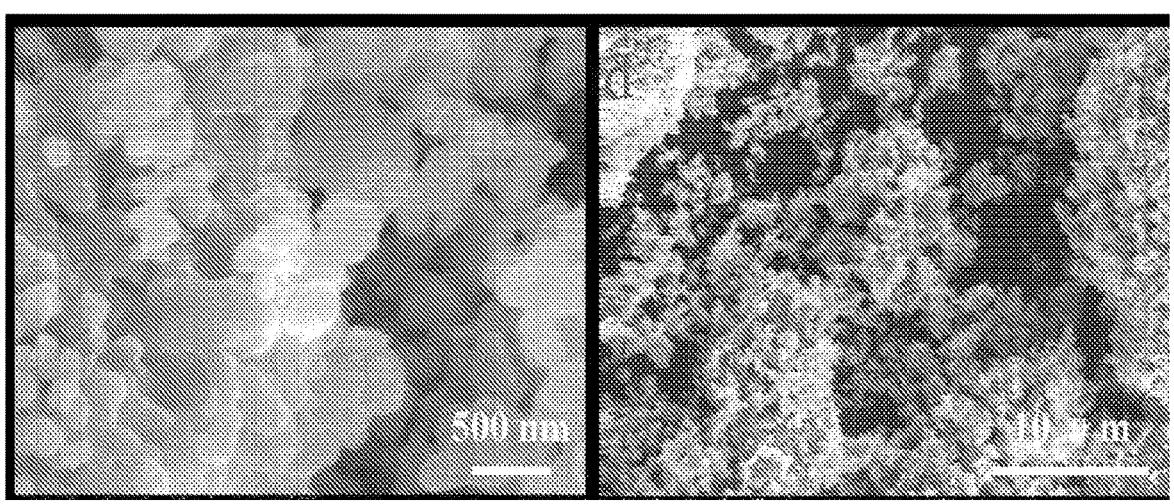

FIGS. 2A and 2B shows SEM images for the $Li_{1.2}Ni_{0.2}Mn_{0.6}O_2$ powder synthesized by the preferred co-precipitation method at 500 nm and 10 μm magnification scales. The images show that the obtained precursor has spherical morphology with particle sizes in the range of 2-3 μm. These micro-spherical particles are composed of primary particles with diameters of about 150 nm on average. Moreover, we note that the agglomeration of the grains for $Li_{1.2}Ni_{0.2}Mn_{0.6}O_2$ powder synthesized by our preferred method is controlled by aging in the sealed container, which provides the improved physical properties of the material, such as the specific surface area and tap density. The sample synthesized by the conventional method shows an agglomeration secondary particle with a large particle size distribution.

Figure 3:
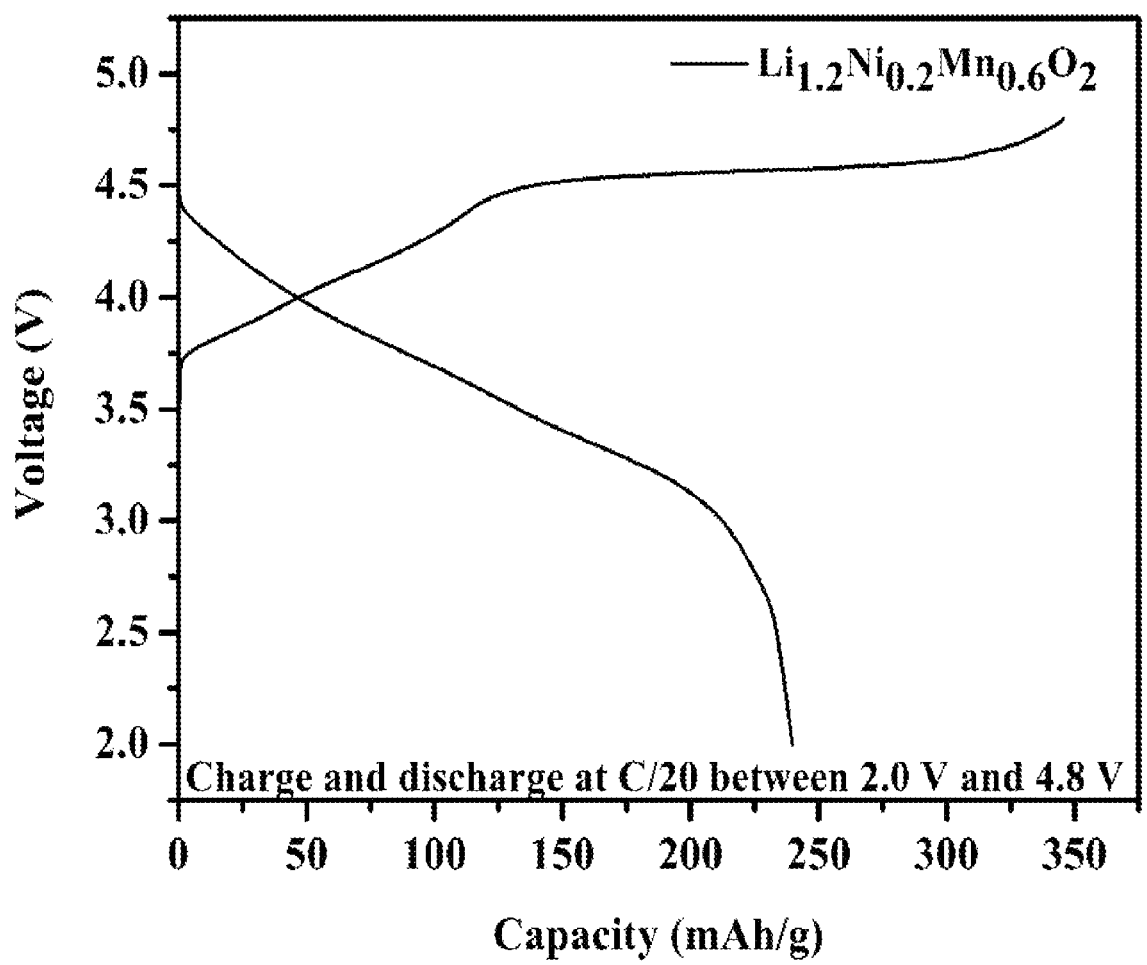
FIG. 3 is an initial charge/discharge plot of $Li_{1.2}Ni_{0.2}Mn_{0.6}O_2$ synthesized by a preferred co-precipitation method of the invention.

We have studied the effects of our morphology control process on the electrochemical performance of $Li_{1.2}Ni_{0.2}Mn_{0.6}O_2$ cathode materials. The first charge/discharge curves of the sample synthesized through a preferred co-precipitation method are given in FIG. 3. When charged and discharged at a rate of 0.05 C between 2.0 V and 4.8 V, the sample can deliver a discharge capacity of about 250 mA h $g^{-1}$, which is consistent with the literature result for the same material.

Figure 4A:
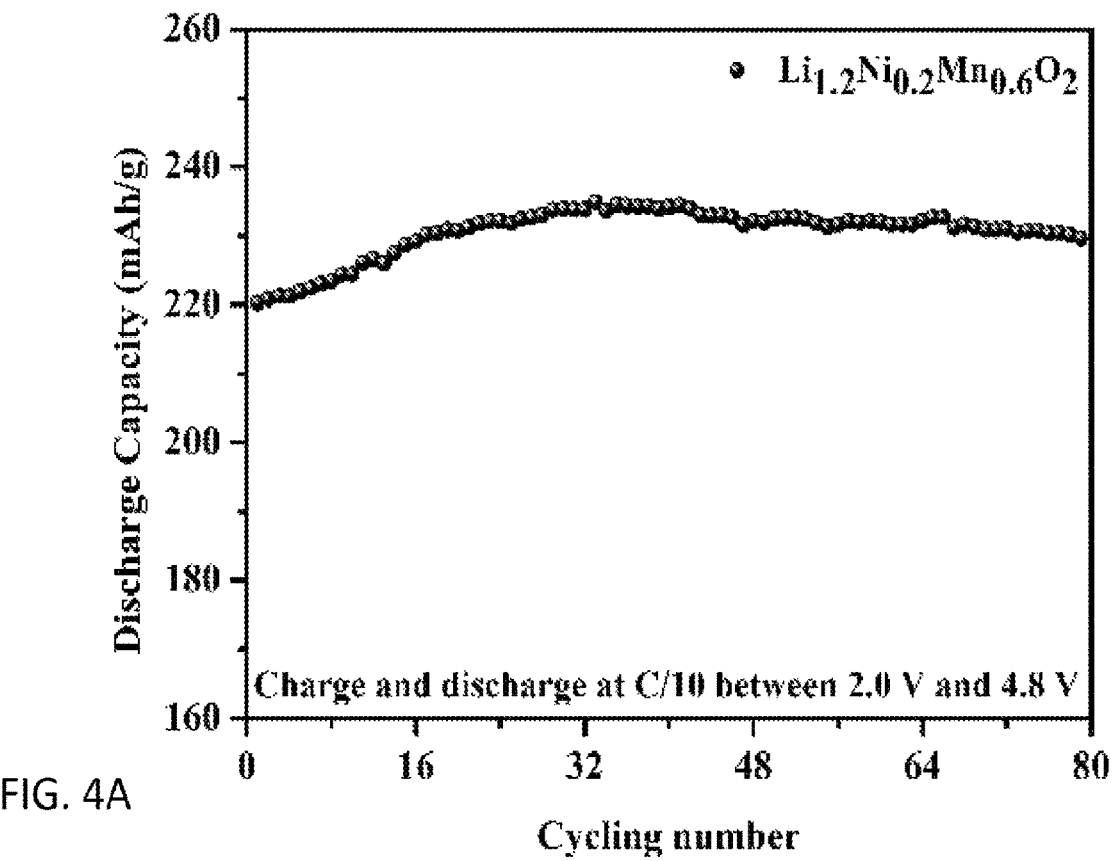
FIGS. 4A and 4B are plots of cycling performance of sample $Li_{1.2}Ni_{0.2}Mn_{0.6}O_2$: synthesized by a preferred co-precipitation method of the invention and FIGS. 4C and 4D of $Li_{1.2}Ni_{0.2}Mn_{0.6}O_2$: synthesized by conventional co-precipitation method without morphology control.
Figure 4C:
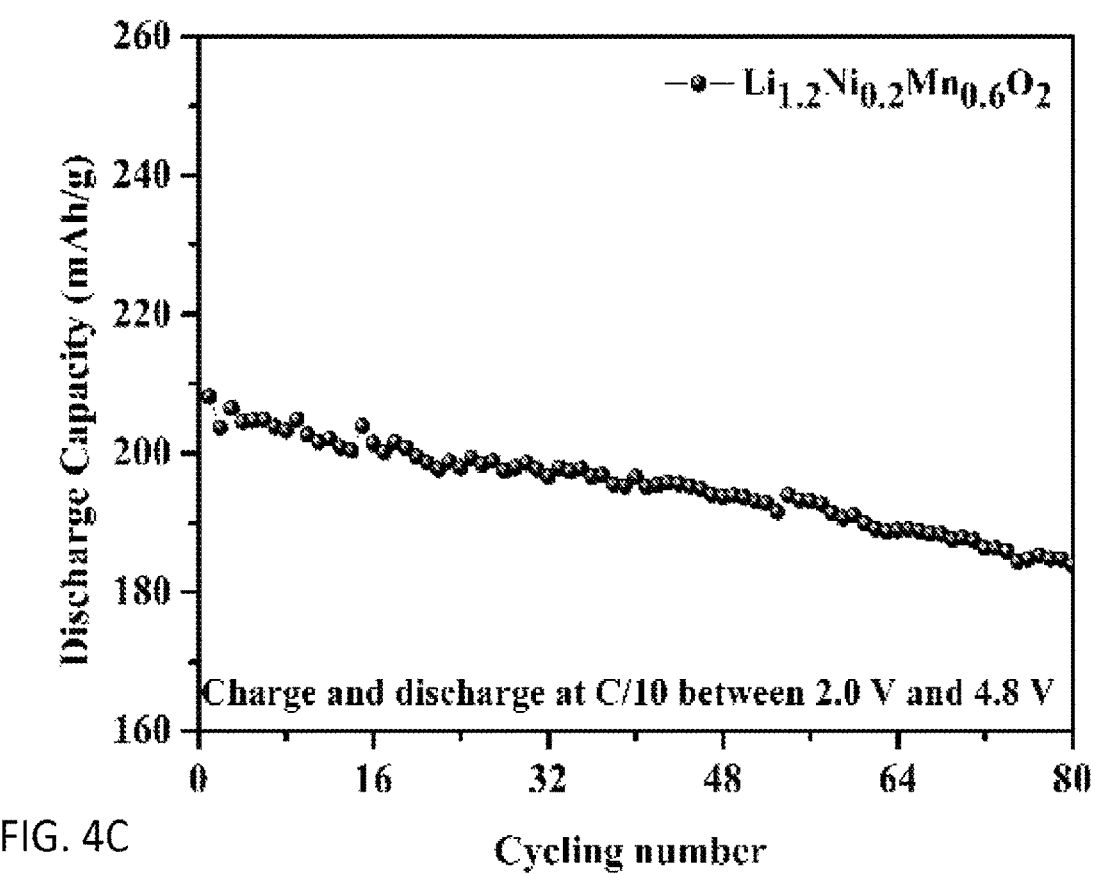
Figure 4B:
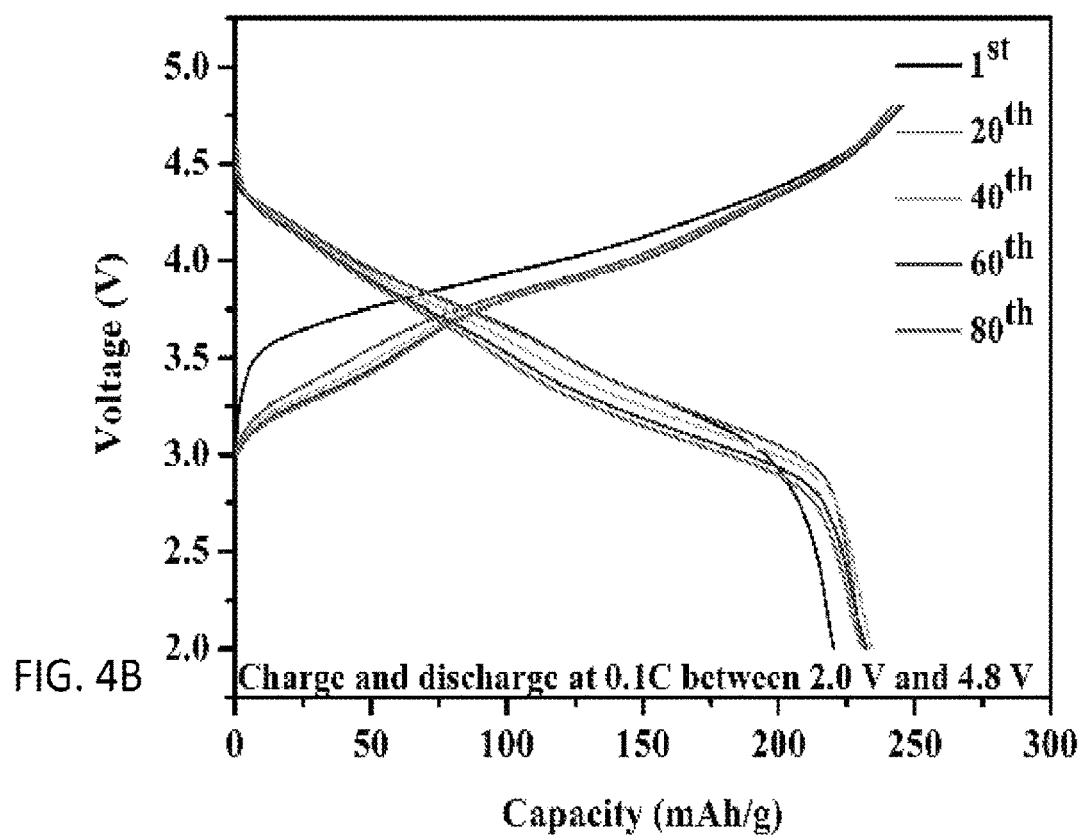
Figure 4D:
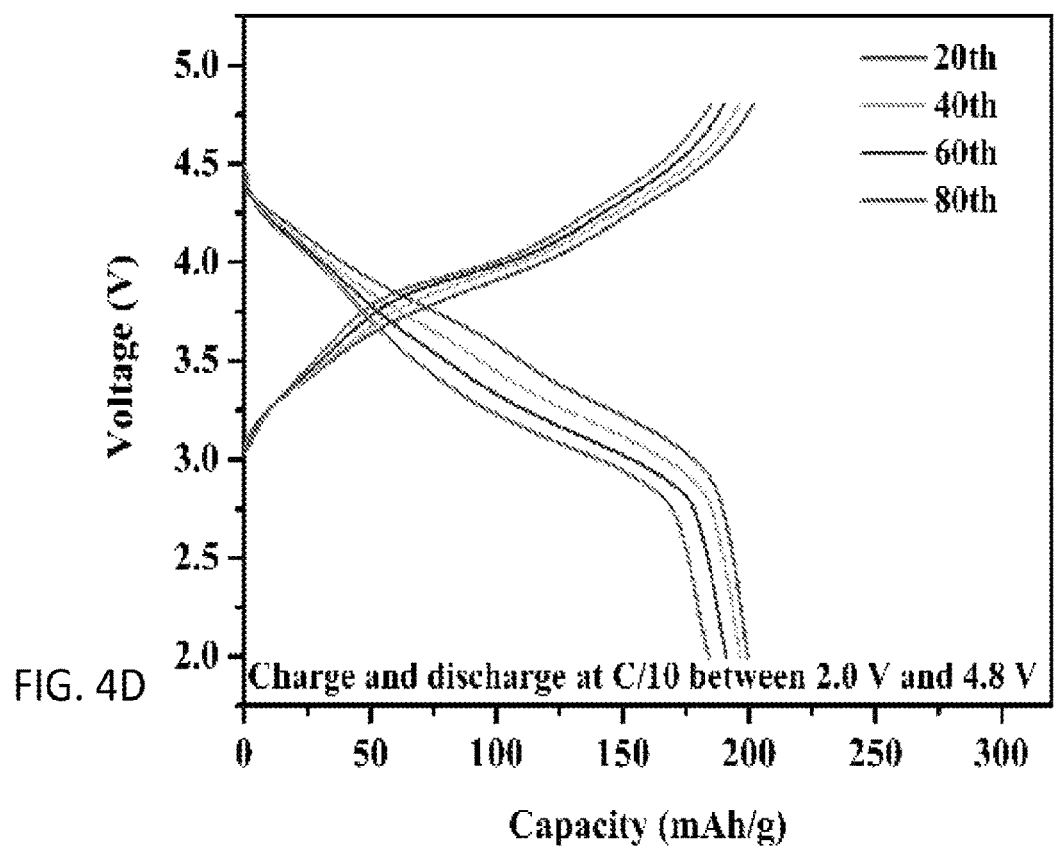

FIGS. 4A and 4C compare cycling performance and FIGS. 4B and 4D discharge profiles for $20^{th}$, $40^{th}$, $60^{th}$ and $80^{th}$ cycles of a preferred sample $Li_{1.2}Ni_{0.2}Mn_{0.6}O_2$ under a current density of 25 mA $g^{-1}$, in the voltage range of 2.0-4.8 V to a sample lacking morphology control. Compared with the sample without morphology control (FIGS. 4C and 4D), the morphology control sample not only shows a large discharge capacity (220 mAh/g) at the first cycle, but also it exhibits almost the same capacity and voltage curve at the 80th cycle ((FIGS. 4A and 4B)), which shows the preferred co-precipitation method holds promise for resolving the problem of the capacity and voltage fading during cycling of lithium-excess materials.

Experiment 2

Figure 5A:
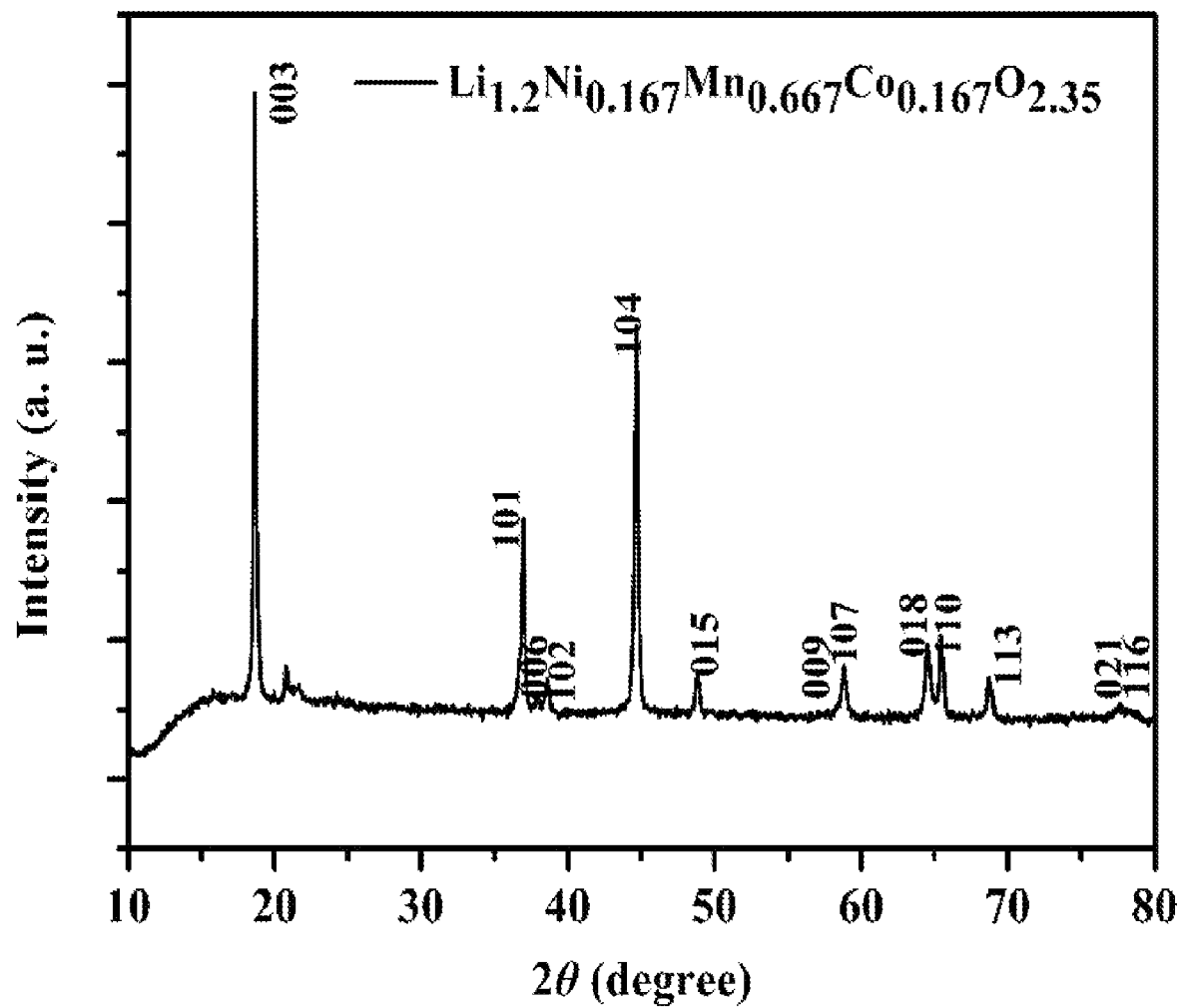
FIGS. 5A-5C are respectively an XRD pattern and SEM images of different magnifications of sample $Li_{1.2}Ni_{0.136}Mn_{0.544}Co_{0.136}O_2$ synthesized by a preferred co-precipitation method of the invention.

Following the synthesis protocol in Experiment 1, $Li_{1.2}Ni_{0.136}Mn_{0.544}Co_{0.136}O_2$ is obtained in this experiment. The XRD pattern of the $Li_{1.2}Ni_{0.136}Mn_{0.544}Co_{0.136}O_2$ sample is shown in FIG. 5A. Sharp reflections in the XRD patterns reveal the high crystallinity of the samples. All XRD peaks in the two patterns can be indexed as a hexagonal $\alpha$-$NaFeO_2$ structure (space group: R-3m, NO. 166), except for a few broad peaks between 20° and 25°. The diffraction peaks between 20° and 25° are known to be caused by the superlattice ordering of Li and Mn in the transition metal layers for the layered Li-excess oxides, which proves the existence of $Li_2MnO_3$ component.

Figure 5B:
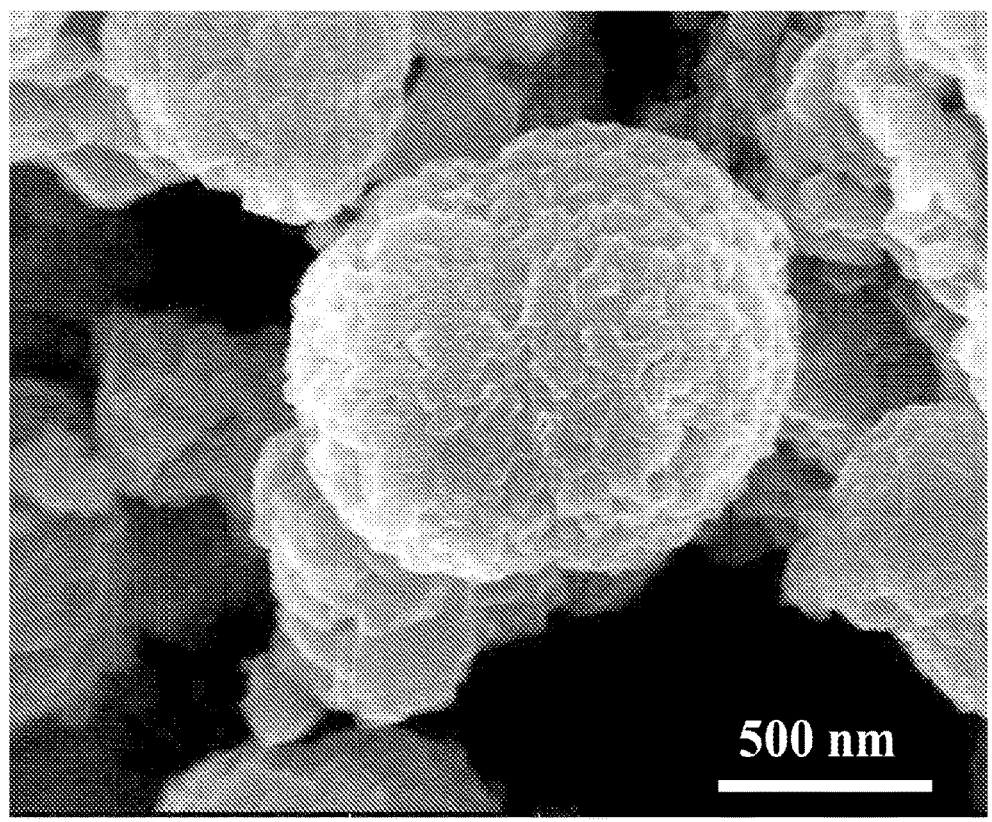
Figure 5C:
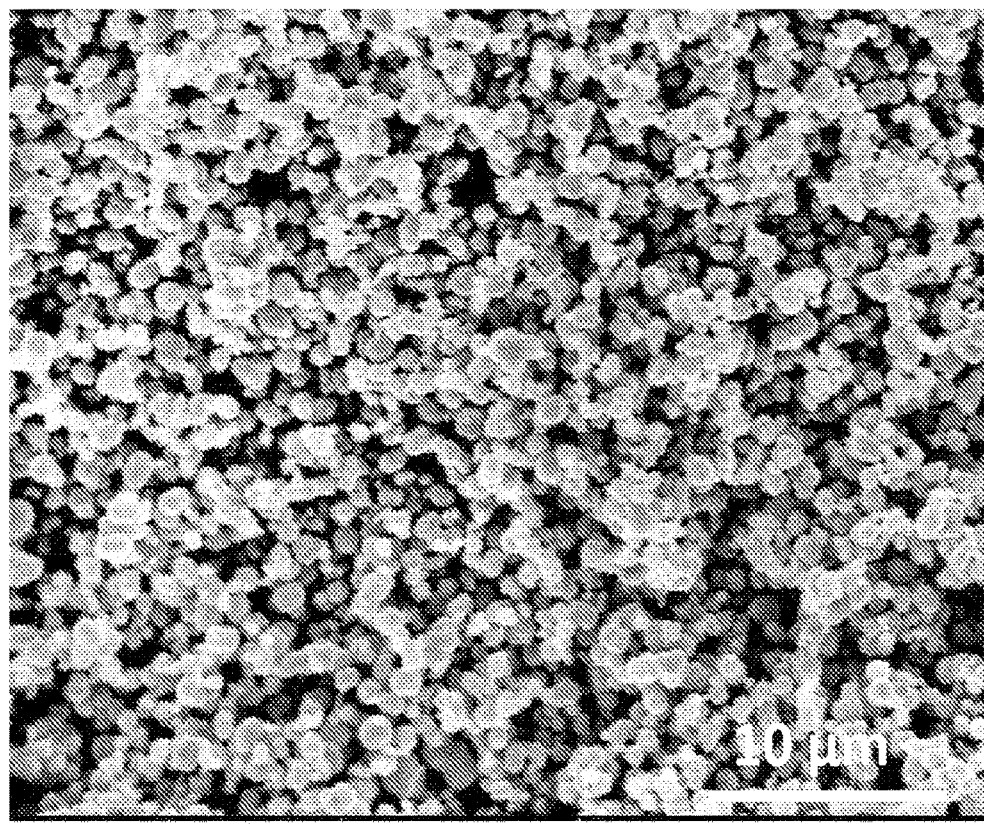

FIGS. 5B and 5C are SEM images for the $Li_{1.2}Ni_{0.136}Mn_{0.544}Co_{0.136}O_2$ powder synthesized by the preferred co-precipitation method at respective 500 nm and 10 μm magnification scales. Even though the size of the primary particles increases to 150 nm due to the lithiation reaction and crystal growth, the spherical morphology of the precursor is preserved at high temperature. Moreover, we note that the agglomeration of the grains for $Li_{1.2}Ni_{0.136}Mn_{0.544}Co_{0.136}O_2$ powder synthesized by our preferred method is controlled by aging in the sealed container, which is leveraged for the improvement of the physical properties of the material, including smaller secondary particle size that leads to less cracking and fewer voids. The tight structure with less void volume will improve the tap density as well as volumetric energy density of the battery.

Figure 6:
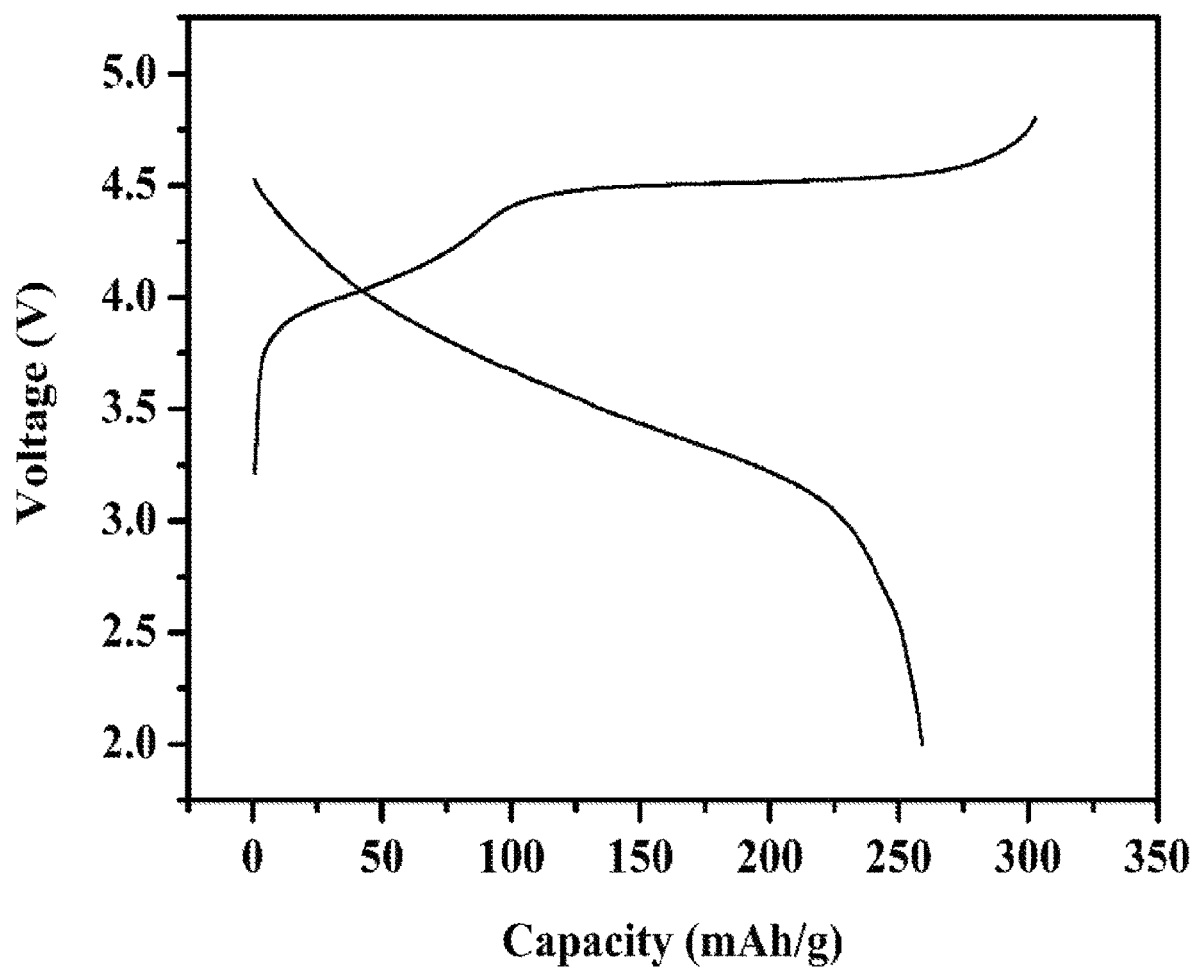
FIG. 6 is an initial charge/discharge plot of $Li_{1.2}Ni_{0.136}Mn_{0.544}Co_{0.136}O_2$ synthesized by a preferred co-precipitation method of the invention.

FIG. 6 shows the first-cycle voltage profiles of $Li_{1.2}Ni_{0.136}Mn_{0.544}Co_{0.136}O_2$ cathode in the voltage range of 2-4.8 V under gravimetric current density of 25 mA/g (1 C=250 mAh/g). The sample synthesized by co-precipitation method of the invention is composed of a slope region and a long plateau that is still at about 4.5V with a capacity at about 325 mAh/g. The slope region (<4.5 V) is attributed to the extraction of $Li^+$ ions from the lithium layer. After this process, the $Ni^{2+}$ was oxidized to $Ni^{4+}$. The subsequent long plateau is caused by a concomitant loss of oxygen from the material lattice. This gives a high capacity in the subsequent cycling. The sample with $Li_2CO_3$ as precipitant shows a high discharge capacity (270 mAh/g) at 0.1 C rate and small irreversible capacity for the first cycle.

Experiment 3

Figure 7A:
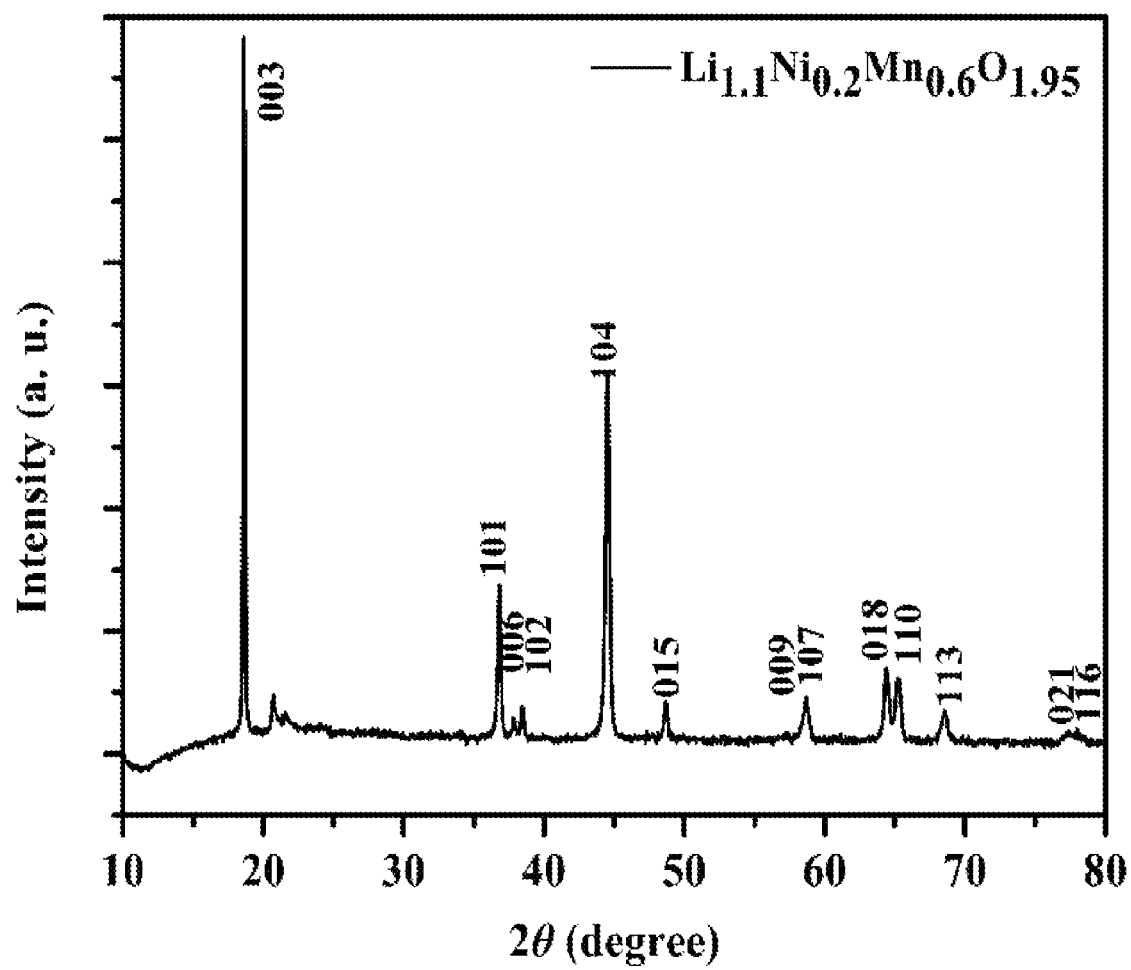
FIGS. 7A-7C are respectively an XRD pattern and SEM images of different magnifications of sample $Li_{1.1}Ni_{0.2}Mn_{0.6}O_{1.95}$ synthesized by a preferred co-precipitation method of the invention.

Following the synthesis protocol in Experiment 1, $Li_{1.1}Ni_{0.2}Mn_{0.6}O_{1.95}$ is obtained in this experiment. The XRD pattern of the $Li_{1.1}Ni_{0.2}Mn_{0.6}O_{1.95}$ sample is shown in FIG. 7A. Sharp reflections in the XRD patterns reveal the high crystallinity of the samples.

Figure 7B:
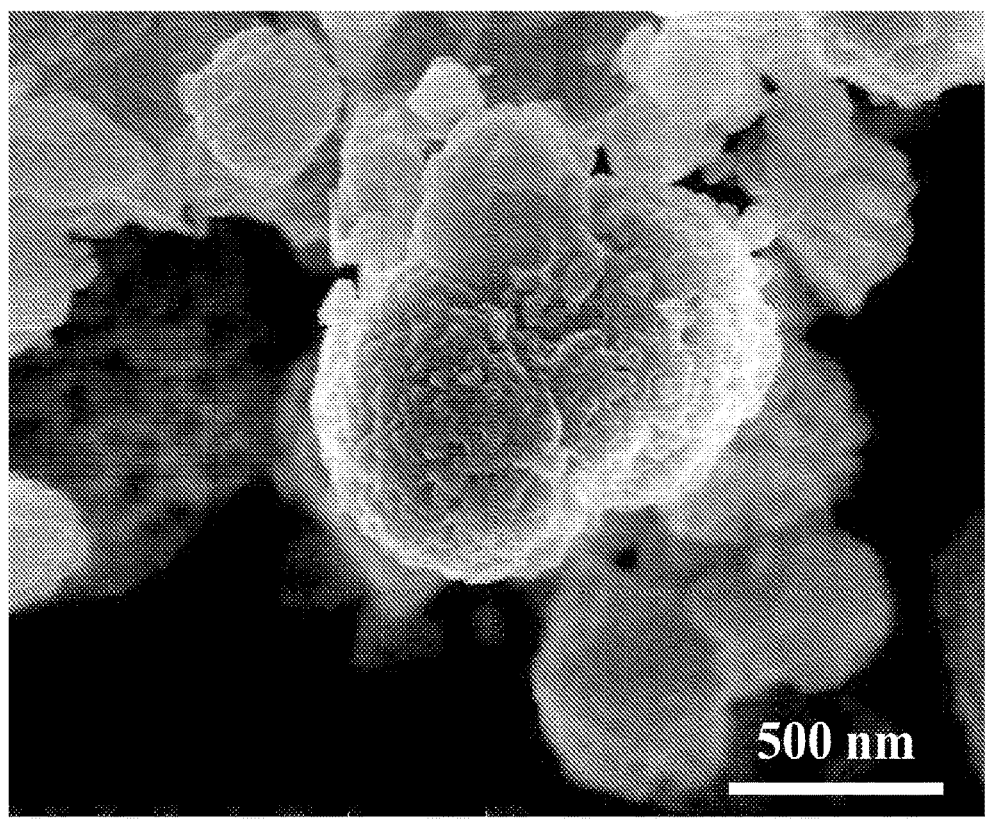
Figure 7C:
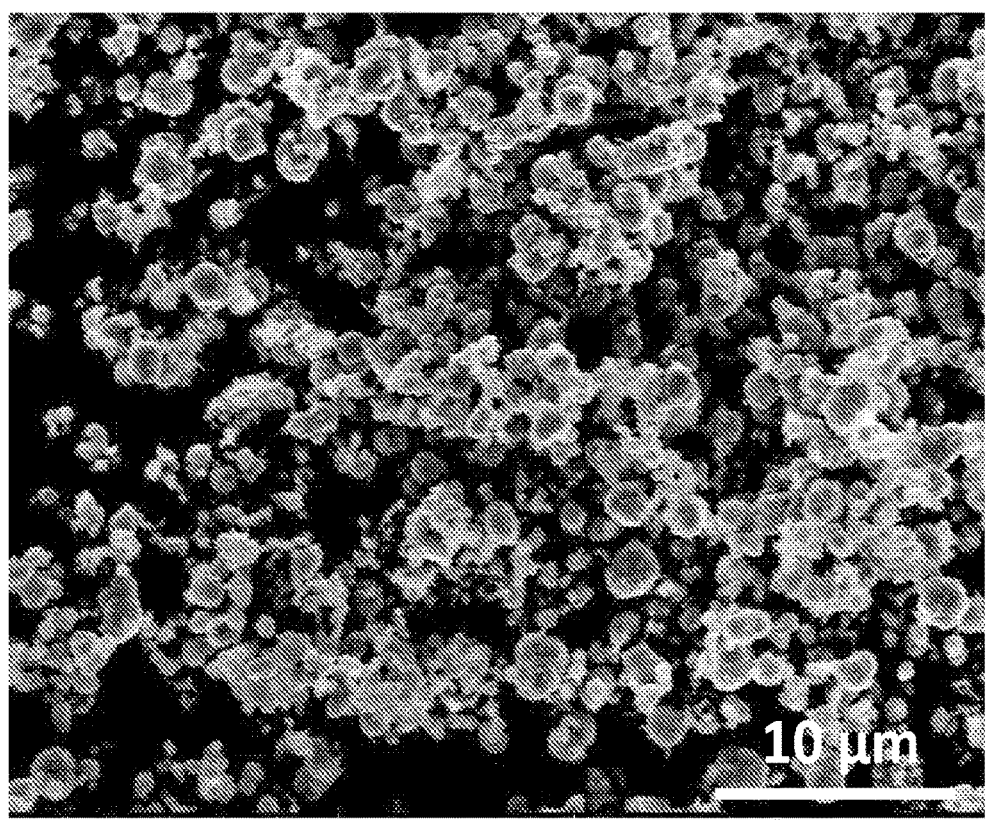

FIGS. 7B and 7C are SEM images for the $Li_{1.1}Ni_{0.2}Mn_{0.6}O_{1.95}$ powder synthesized by the preferred co-precipitation method at respective 500 nm and 10 μm magnification scales. The spherical morphology of the precursor is preserved at high temperature. Moreover, we note that the agglomeration of the grains for $Li_{1.1}Ni_{0.2}Mn_{0.6}O_{1.95}$ powder synthesized by our preferred method is controlled by the aging.

Experiment 4

Figure 8A:
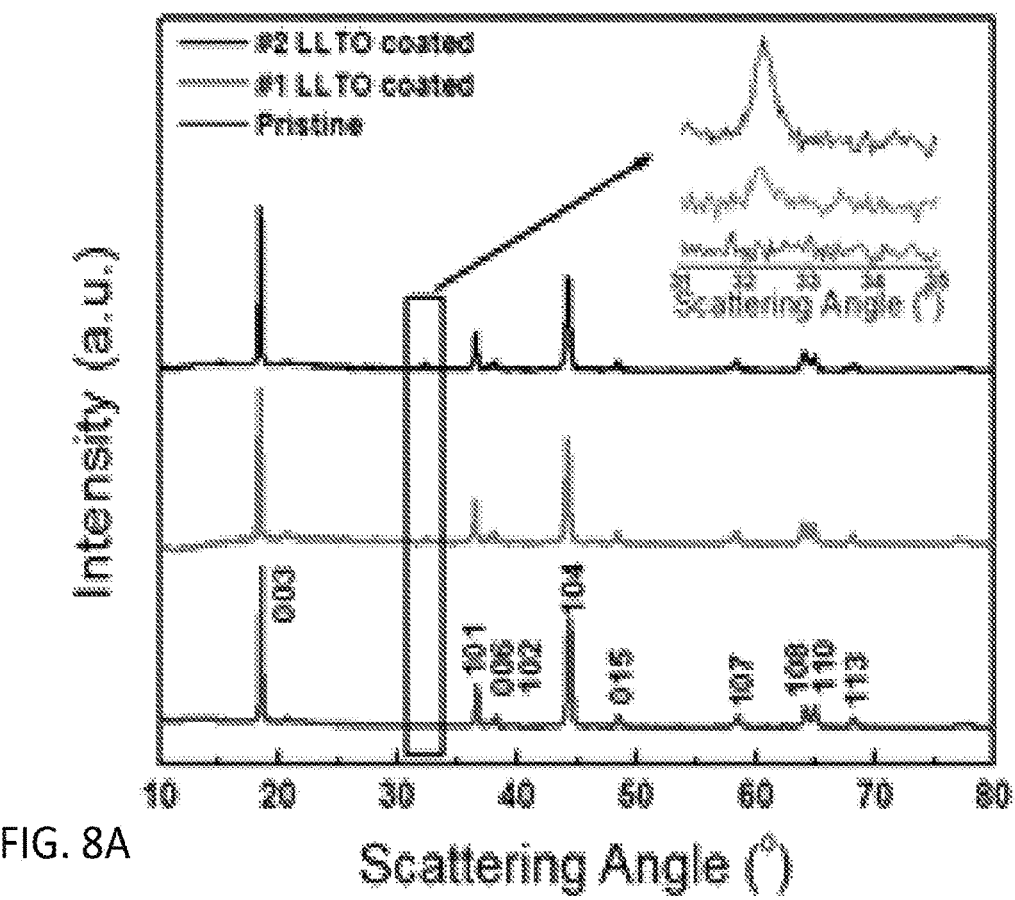
FIG. 8A is an XRD pattern and FIGS. 8B-8D plots of electrochemical performance of morphology controlled $Li_{1.13}Ni_{0.3}Mn_{0.57}O_2$ synthesized by a preferred co-precipitation method of the invention and coated with Lithium Lanthanum Titanium Oxides (LLTO) under different coating conditions.

Morphology controlled $Li_{1.13}Ni_{0.3}Mn_{0.57}O_2$ was further coated with Lithium Lanthanum Titanium Oxides (LLTO) under different coating conditions in this experiment. FIG. 8A presents the XRD of LNMO before and after LLTO coating. As the inset figure indicates, the intensity of the LLTO peak depends on the coating conditions. These materials were made into Li coin cells. Figure x compares the first cycle voltage profile of LNMO, #1 LLTO coated LNMO and #2 LLTO coated LNMO. The charge/discharge of first cycle were performed at 12.5 mA/g between 2V and 4.8V. The CE improved from 73.1% to 79.1% and 91.4%, respectively.

Figure 8B:
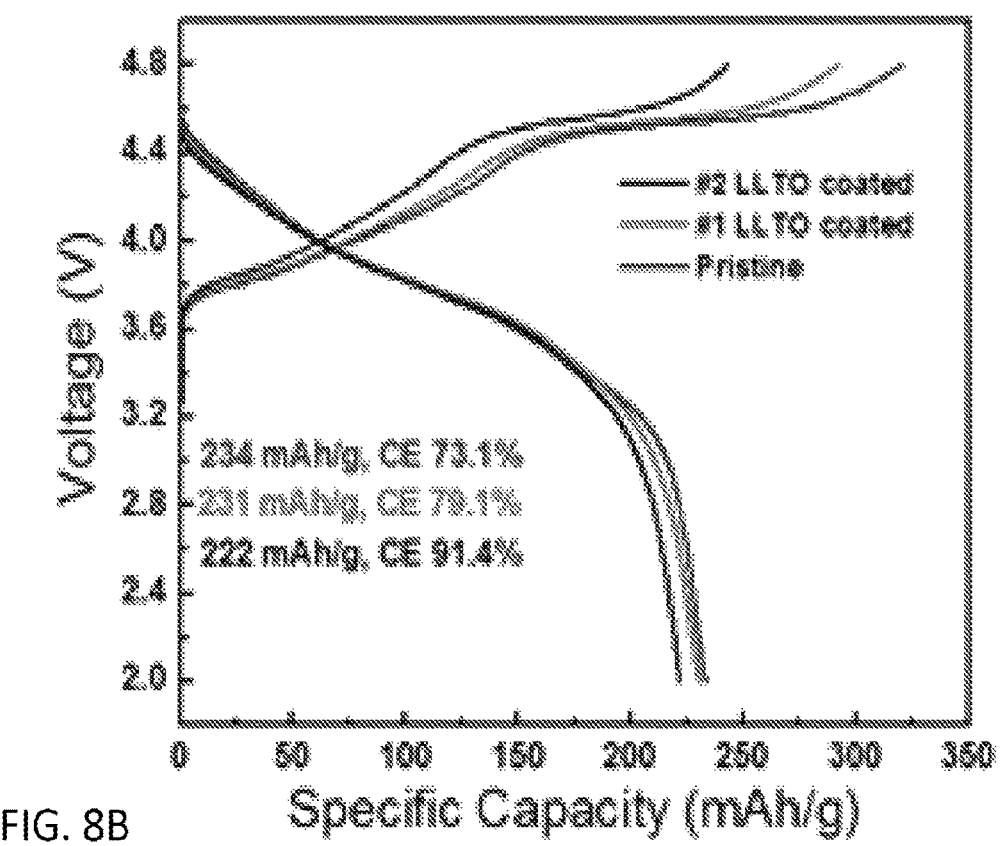
Figure 8C:
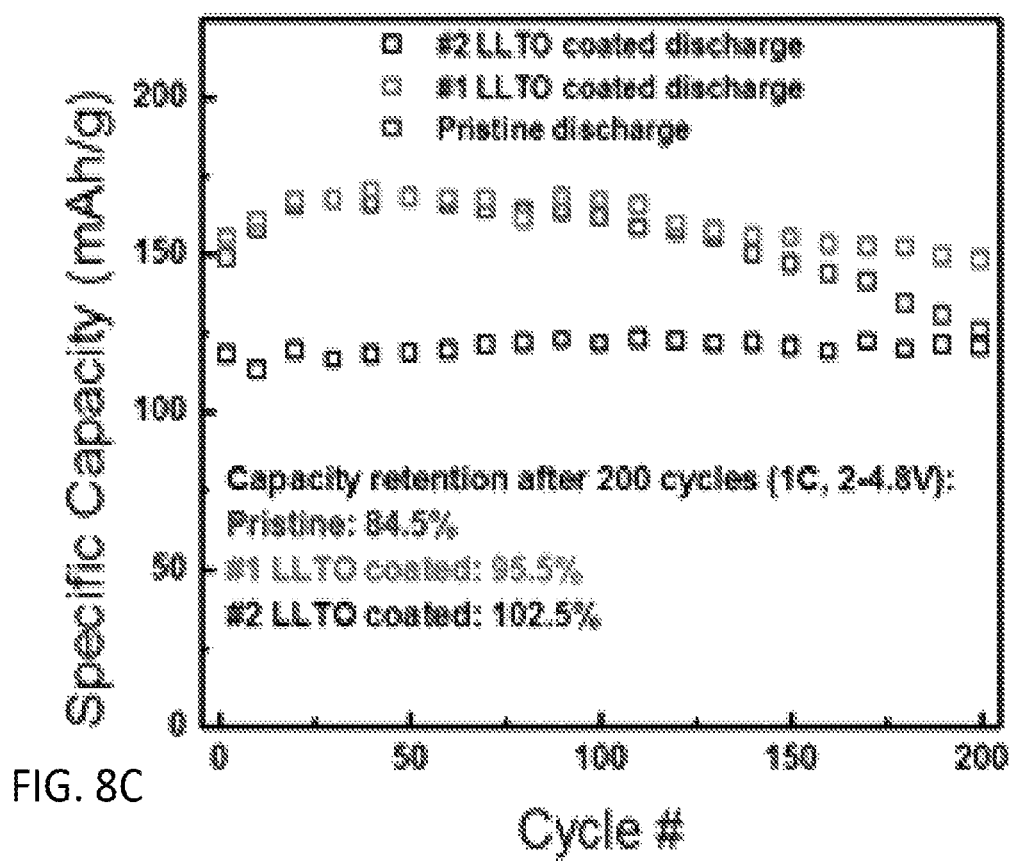
Figure 8D:
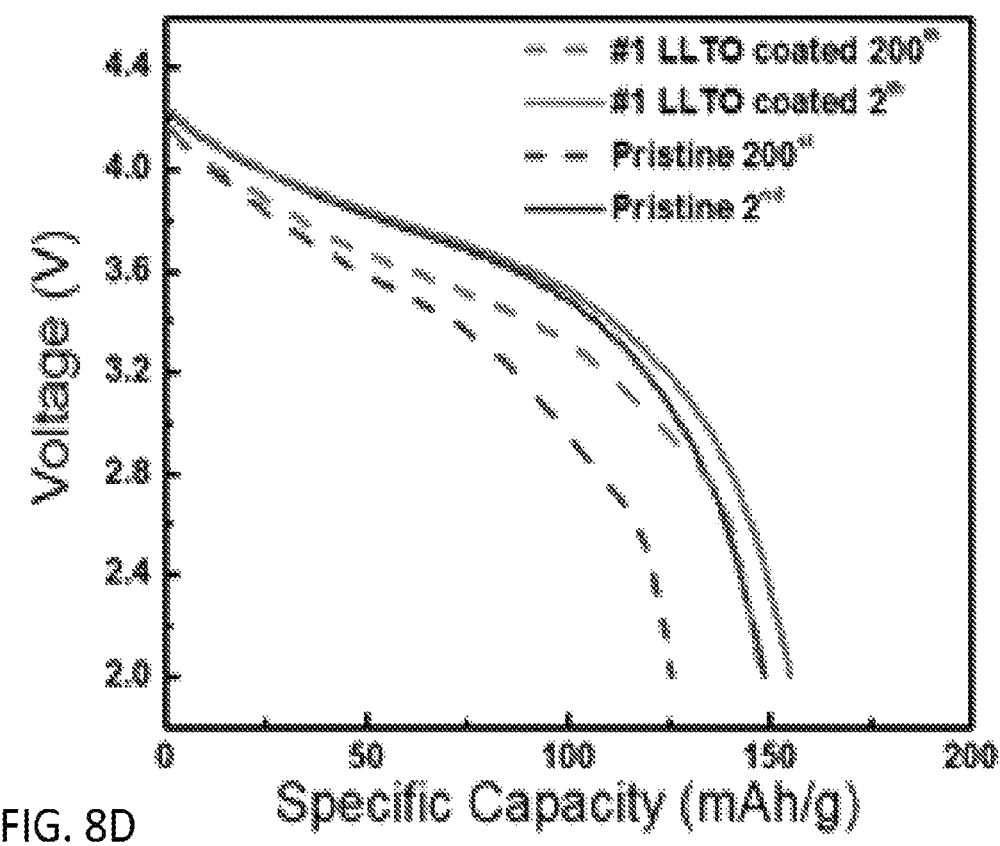

The observed capacity was initially about 234 mAh $g^{-1}$, 231 mAh $g^{-1}$, and 222 mAh $g^{-1}$ for LNMO, #1 LLTO coated LNMO and #2 LLTO coated LNMO at 12.5 mAh $g^{-1}$. FIGS. 8B-8D include date regarding the capacity versus cycles of these materials. The #1 LLTO coated LNMO shows 95.5% capacity retention after 200 cycles which is a better improvement than the LNMO pristine. The voltage profile showed in FIG. 8B indicates that with the help from the LLTO coating, there is less of a voltage fade This result suggests that the LLTO coating holds promise for eliminating LNMO's large initial irreversibility. Moreover, it also has the ability to maintain capacity and voltage retention.

Experiment 5

Figure 9:
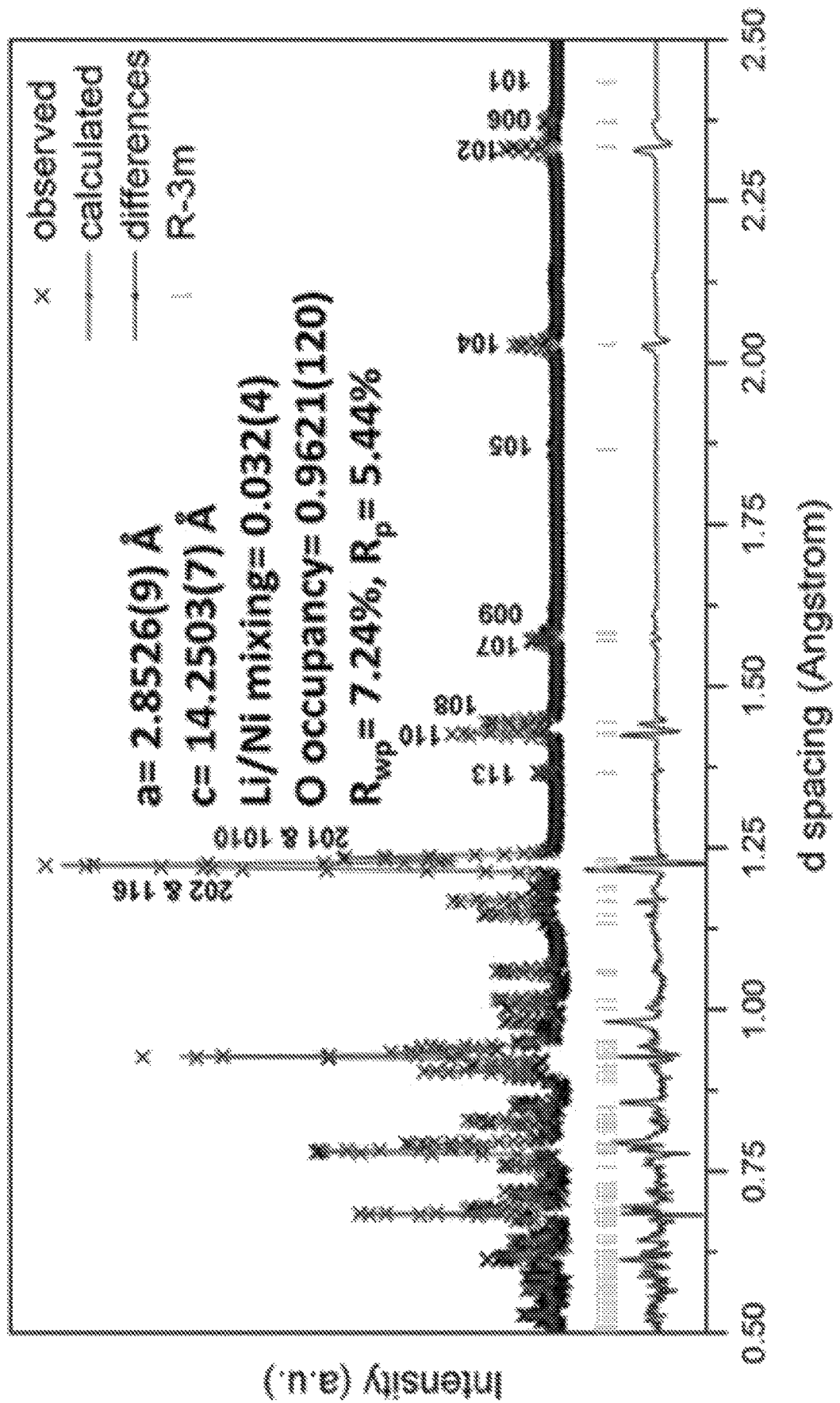
FIG. 9 is a time of flight neutron diffraction (ND) pattern of sample $Li_{1.144}Ni_{0.136}Co_{0.136}Mn_{0.544}O_{1.92}$ synthesized by a preferred co-precipitation method of the invention.

Following the similar synthesis protocol in Experiment 1, $Li_{1.144}Ni_{0.136}Co_{0.136}Mn_{0.544}O_{1.92}$ is obtained in this experiment. FIG. 9 illustrates time of flight neutron diffraction (ND) patterns for the sample. the lattice parameters of the sample are a=2.8526(8) Å and c=14.2503(7) Å. The oxygen occupancy is reduced to 96.21±1.20%, which clearly shows oxygen vacancies formation of the sample.

Figure 10:
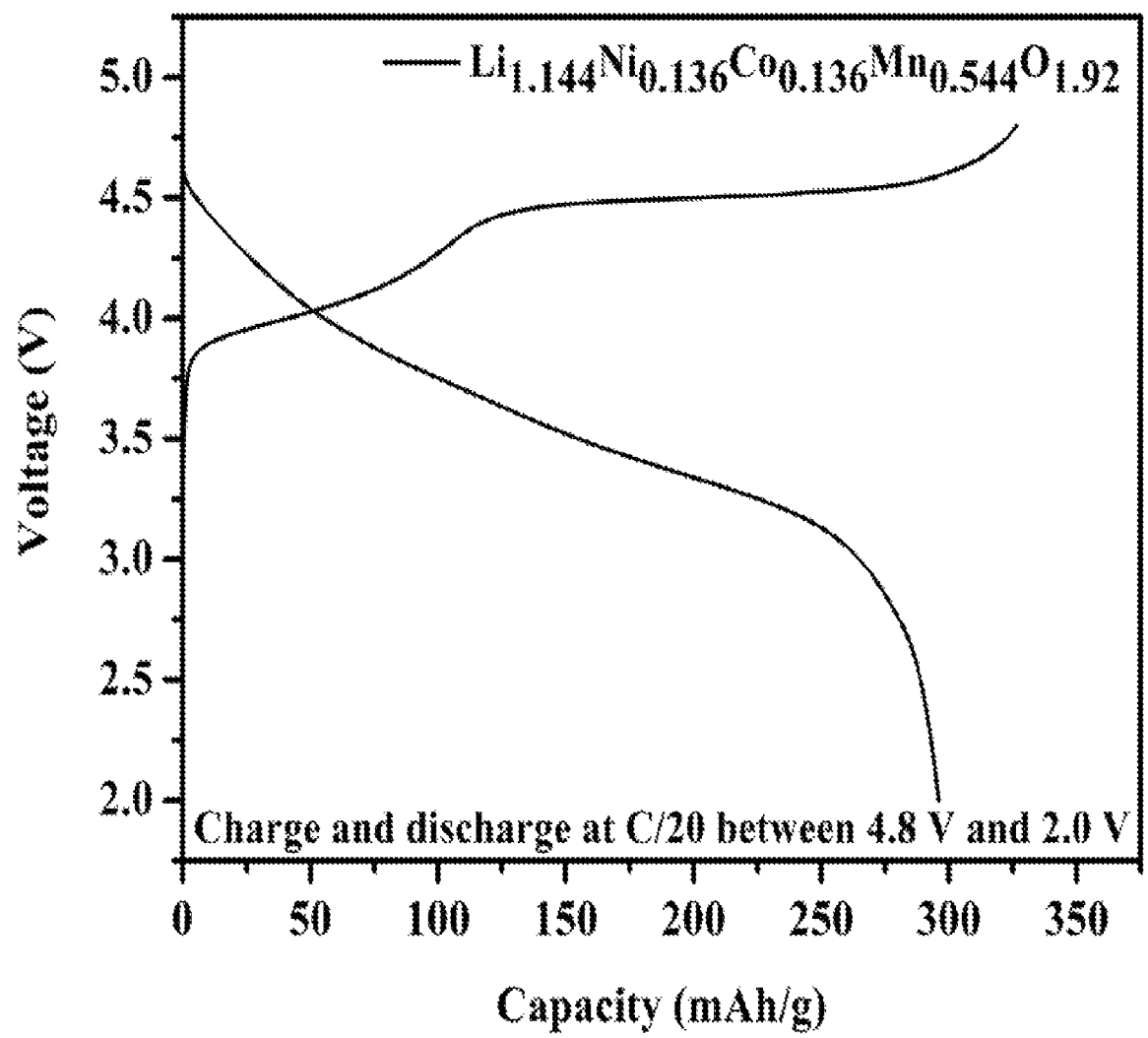
FIG. 10 is a first charge-discharge profile of sample $Li_{1.144}Ni_{0.136}Co_{0.136}Mn_{0.544}O_{1.92}$ synthesized by a preferred co-precipitation method of the invention.

FIG. 10 shows first charge-discharge profile of $Li_{1.144}Ni_{0.136}Co_{0.136}Mn_{0.544}O_{1.92}$ obtained from a commercially available 2016-type coin cell at 0.05 C-rate where 1.0 C-rate corresponds to the current density of 250 mA g$^{-1}$. The value of the initial discharge capacity for the sample can reach as high as 300 mAh g$^{-1}$. The initial coulombic efficiency also increases to 92.6%. Electrochemical measurements prove that surface oxygen vacancies introduction in Li excess cathodes without severe structural destruction has a considerable effect on improving electrochemical performance.

Experiment 6

Figure 11:
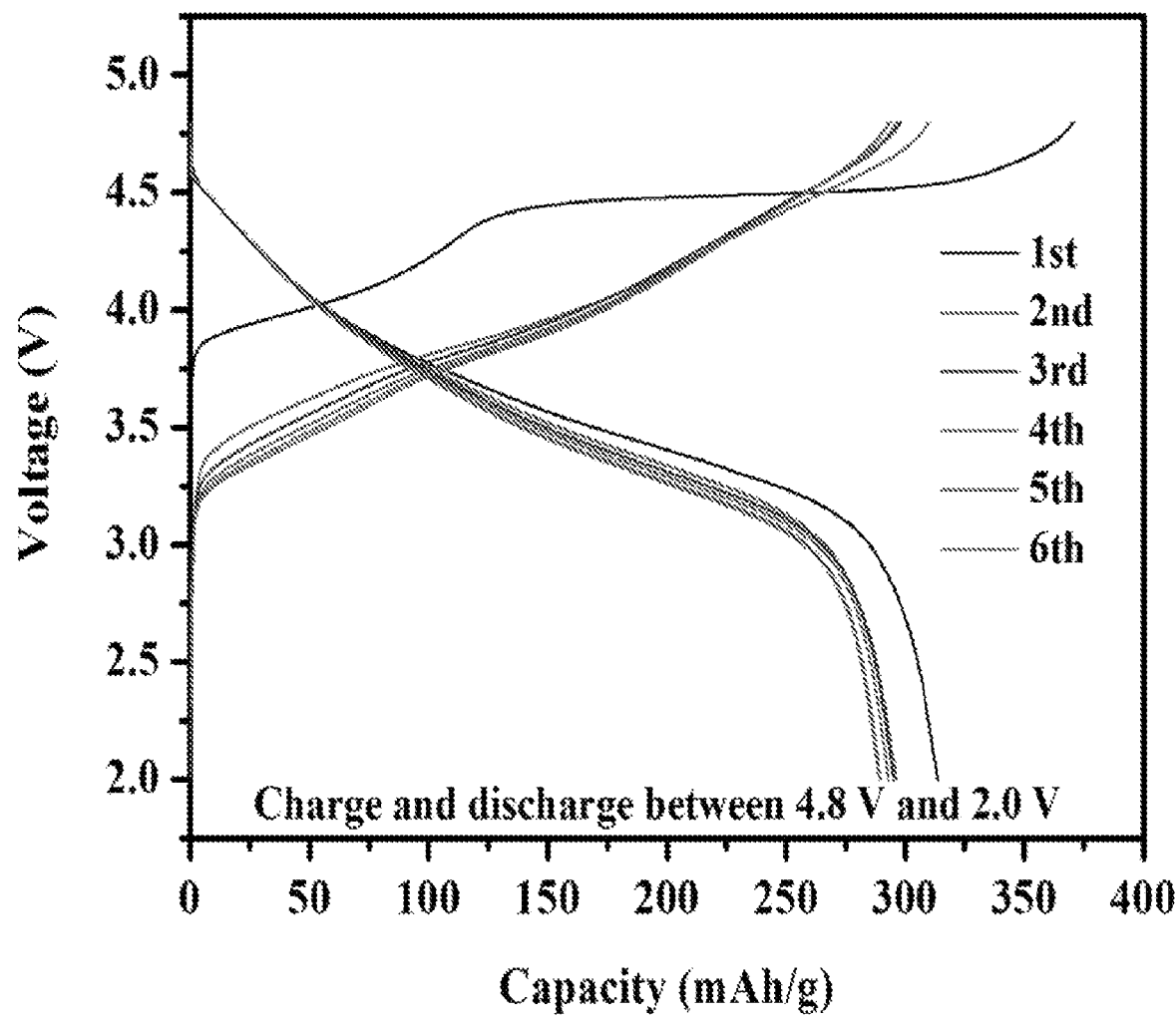
FIG. 11 is a first charge-discharge profile and cycling performance of sample $Li_{1.18}Ni_{0.135}Co_{0.135}Mn_{0.539}Mo_{0.01}O_2$ synthesized by a preferred co-precipitation method of the invention.

Following the synthesis protocol in Experiment 1, $Li_{1.18}Ni_{0.135}Co_{0.135}Mn_{0.539}Mo_{0.01}O_2$ is obtained in this experiment. FIG. 11 shows first charge-discharge profile of $Li_{1.18}Ni_{0.135}Co_{0.135}Mn_{0.539}Mo_{0.01}O_2$ obtained from a 2016-type coin cell at 0.05 C-rate where 1.0 C-rate corresponds to the current density of 250 mA g$^{-1}$. The value of the initial discharge capacity for the sample can reach as high as 313 mAh g$^{-1}$. FIG. 11 also presents the cycling performance as well as discharge profiles of the sample $Li_{1.18}Ni_{0.135}Co_{0.135}Mn_{0.539}Mo_{0.01}O_2$ under a current density of 25 mA g$^{-1}$, in the voltage range of 2.0-4.8 V. Clearly, it exhibits almost the same capacity and voltage curve after cycling, which shows the preferred co-precipitation method with Mo doping holds promise for resolving the problem of the capacity and voltage fading during cycling of lithium-excess materials.

TABLE 1

Cycling performance summary results of the sample $Li_{1.2}Ni_{0.2}Mn_{0.6}O_2$: synthesized by the simplified co-precipitation method and conventional co-precipitation method without morphology control.

| | 1$^{st}$ dis. Capacity (mAh/g) | 80$^{th}$ dis. Capacity (mAh/g) | Capacity retention |
|---|---|---|---|
| spherical | 220 | 229 | 104% |
| Non-control | 208 | 183 | 87% |

Typically the preferred materials will only start fading after 100 cycles. The improved cycling performance of the sample synthesized by the preferred co-precipitation method can be attributed to two aspects of example preferred materials: (1) the morphology controlled sample has almost two times fold smaller surface area compared with the sample without morphology control, which will introduce less side reactions between released oxygen and the electrolyte species A thinner solid electrolyte interface layer is thus expected to form on the morphology controlled particles surface, that enables a minimized capacity and voltage fading during cycling process; (2) uniform distributed small secondary particles (~3 μm) increase material meso-structure stability so that no cracks can easily occur within the secondary particles, which will introduce less stress to the whole system.

Experiment 7

$Li[Li_{1.144}Ni_{0.136}Co_{0.136}Mn_{0.544}]O_2$ was synthesized in accordance with the above methods. Specifically, an aqueous solution containing $NiSO_4.6H_2O$, $CoSO_4.7H_2O$, and $MnSO_4.4H_2O$ with a concentration of 2.0 mol L$^{-1}$ was pumpted into a continuously stirred tank reactor (CSTR, capacity of 50 L); at the same time, a 2.0 mol L$^{-1}$ $Na_2CO_3$ solution, and a 0.2 mol L$^{-1}$ $NH_4OH$ solution were added separately into the reactor. The co-precipitation temperature was held at 60° C., and the pH value was fixed to 7.8. The resulting $(Ni_{1/6}Co_{1/6}Mn_{4/6})CO_3$ powders were washed several times with distilled water to remove residual Na$^+$, and dried in a vacuum oven at 80° C. for over 20 h. The resulting precipitates were mixed with $Li_2CO_3$ and the exact molar ratio between them was 0.7. The mixed powders firstly were pre-treated at 500° C. for 5 h in the air and then calcinated at 850° C. for 15 h in the air. Then, they were cooled to room temperature in the furnace. The as-obtained sample was labeled pristine LR-NCM. This sample was then treated to create oxygen vacancies as follows via a gas solid interface reaction (GSIR) process.

The GSIR process of the pristine LR-NCM sample with $CO_2$ was carried out as follows: a set amount of LR-NCM cathode materials and a given amount of $NH_4HCO_3$, which was as the precursor source of $CO_2$ after decomposition at certain temperatures, were placed in an enclosed reactor in an argon-filled glove box ($O_2$<0.1 ppm) with a total volume of 100 mL, and heated at 200° C. for 10 h. The optimal molar ratio between carbon dioxide and Li-excess layered oxides was about 1:5 (~1:5 to 2:5). It is important that the pristine LR-NCM cathode materials and the $NH_4HCO_3$ are separated physically in separate containers at the beginning for ensuring a homogeneous gas-solid interface reaction. To remove the reaction products on the surface of the LR-NCM, the sample obtained was washed with water several times and dried at 120° C. for 12 h. The as-obtained product was termed the GSIR LR-NCM. These procedures have been duplicated to demonstrate the GSIR process. The $CO_2$ released from the precursor under high temperature treatment will react with lattice oxygen in the powder to form $Li_2CO_3$ on the surface. This creates oxygen vacancies.

Figure 12A:
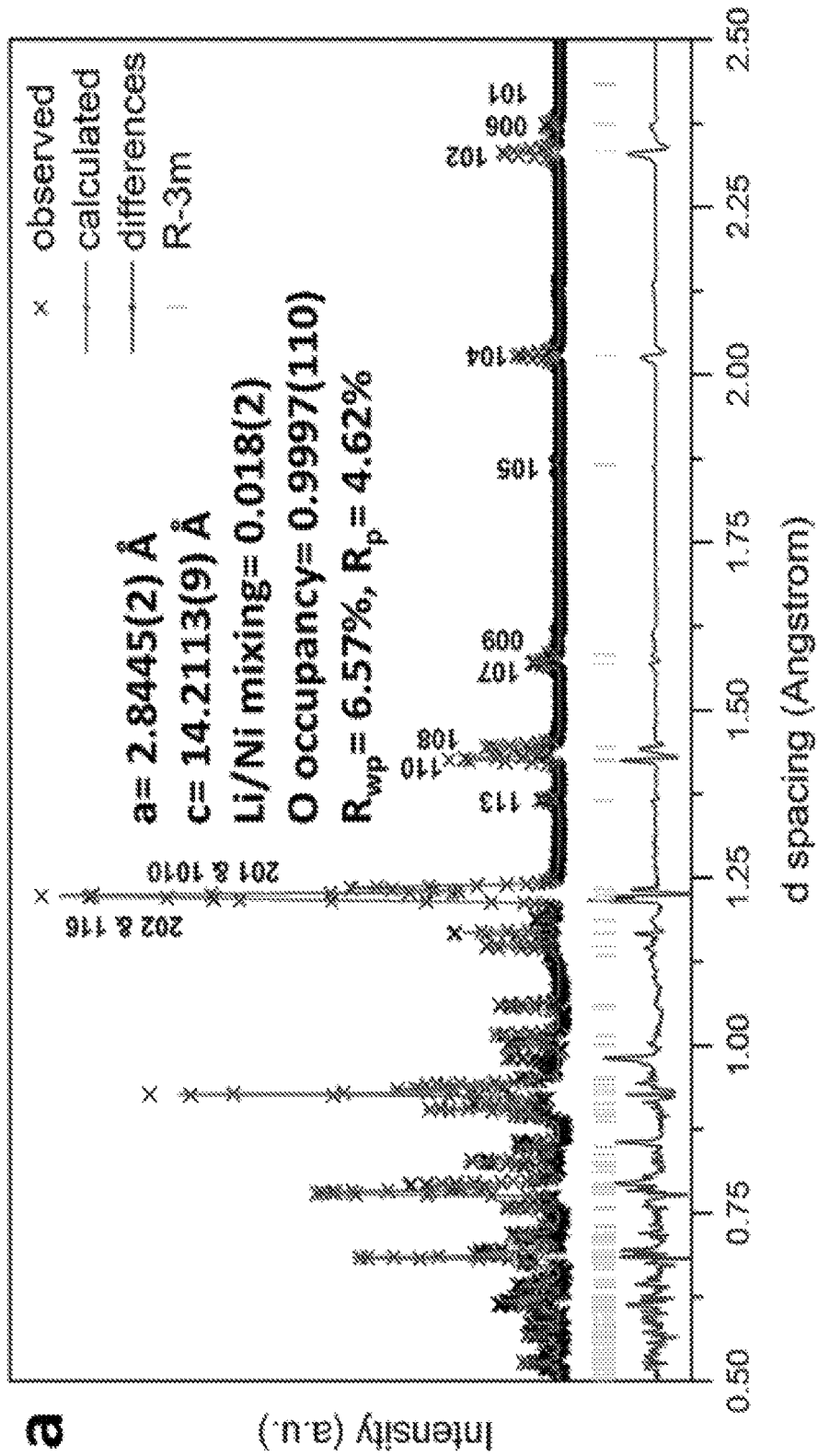
FIGS. 12A and 12B are time of flight neutron diffraction patterns illustrating that a preferred gas solid interfacial modification method to create oxygen vacancies in lithium excess materials has little effect upon crystal structures and bulk electronic properties.
Figure 12B:
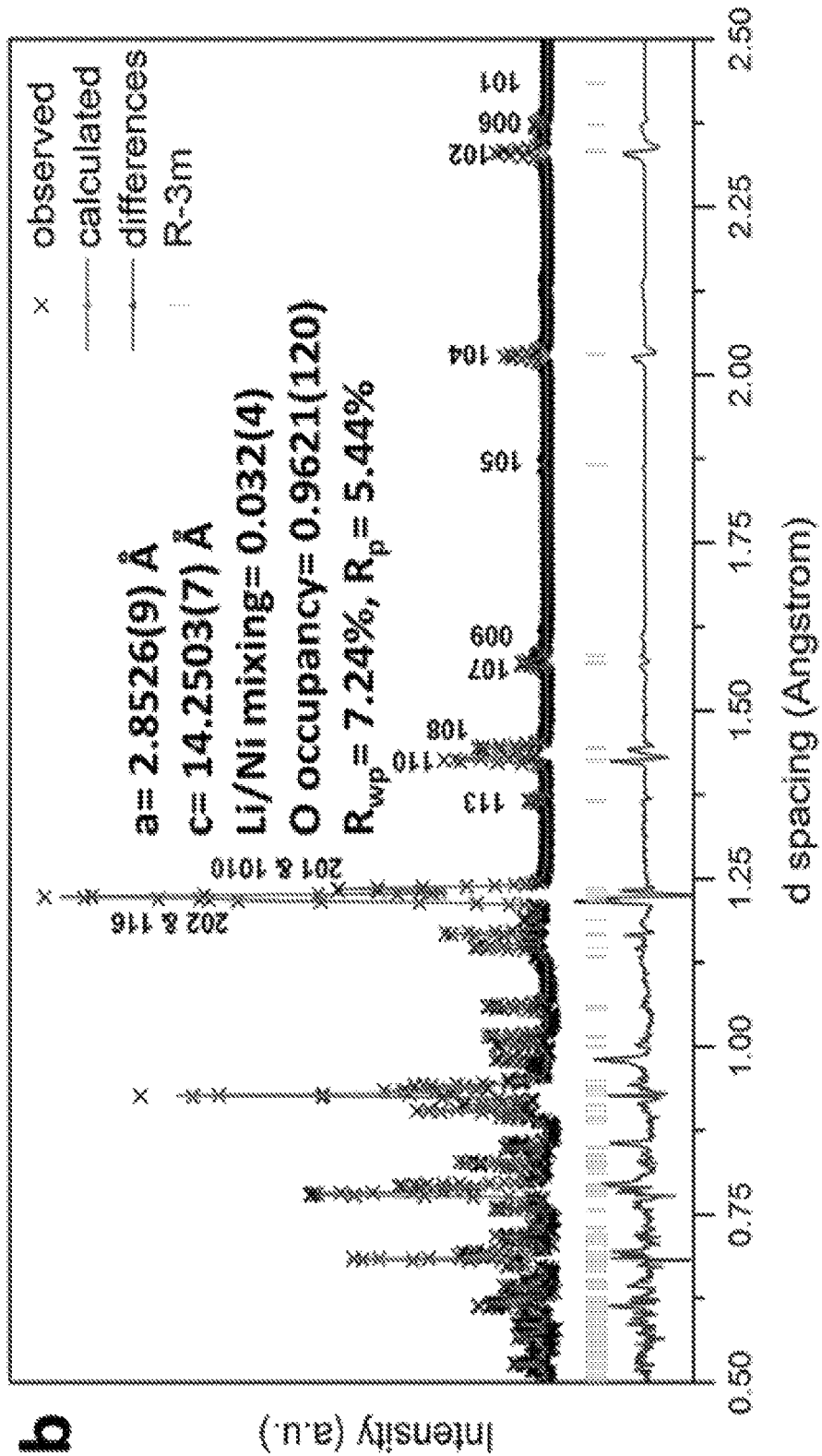

The produced GSIR LR-NCM materials were characterized and showed no significant change in crystal structure compared to the untreated pristine LR-NCM. This showed that the GSIR process does not heavily influence the average crystal structures and bulk electronic environments. This is shown in FIGS. 12A and 12B, which include time of flight neutron diffraction (ND) patterns for the pristine and GSIR LR-NCM. The oxygen vacancy for the GSIR LR-NCM is around three percent higher than that of the pristine LR-NCM sample.

Figure 13A:
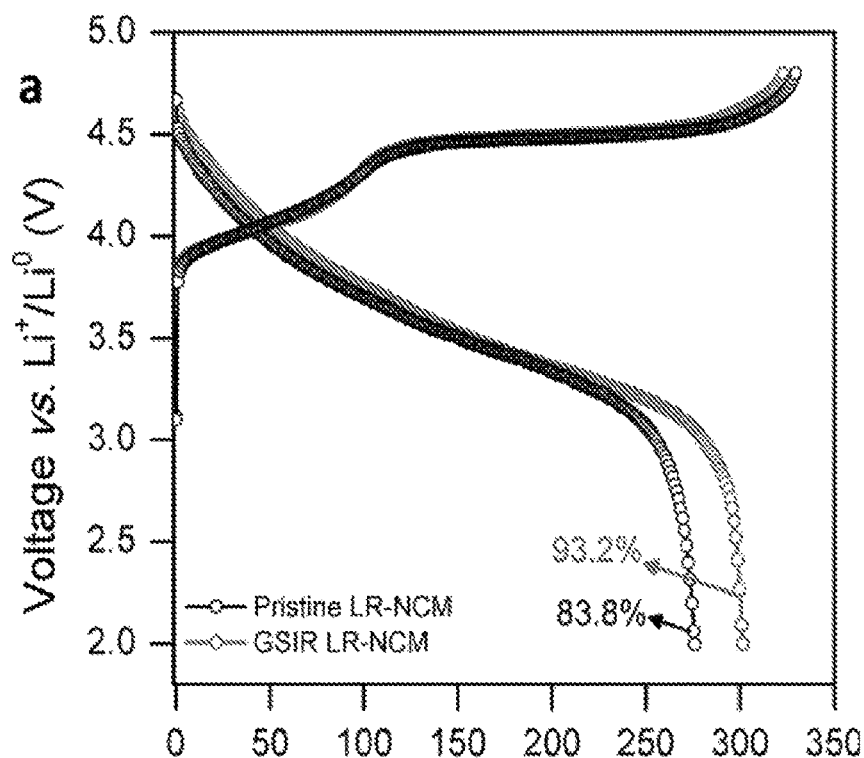
FIG. 13A is a charge-discharge characteristics that compare preferred lithium excess materials with and without excess oxygen vacancies and FIG. 13B compares differential capacities.
Figure 13B:
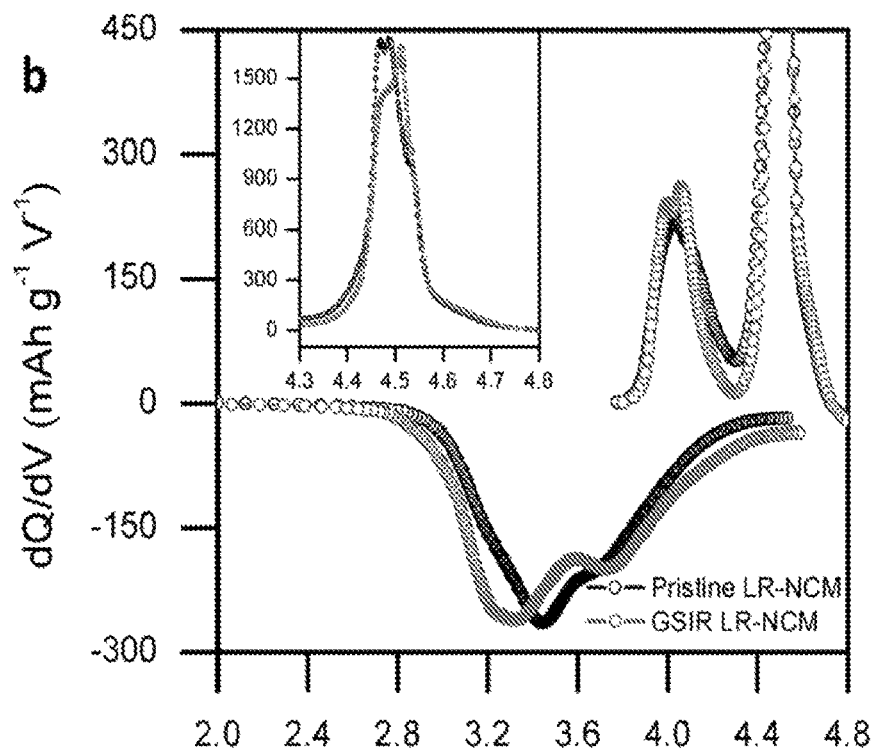

Commercially available CR2032 coin-cells with metallic Li as the counter electrode were assembled to investigate the electrochemical performance of the pristine and GSIR LR-NCM samples. Similar to other Li-excess layered oxides, both of them (FIG. 13A) exhibit a long plateau region at ~4.5 V vs. Li$^+$/Li$^0$, which usually is ascribed to the electrochemical activation of the $Li_2MnO_3$ component during the initial charge process, although an electrolyte/electrode side reaction is expected in this region. Interestingly, the value of the initial discharge capacity for the GSIR LR-NCM can reach as high as 301 mAh $g^{-1}$ compared to that of 276 mAh $g^{-1}$ for the pristine LR-NCM. The initial coulombic efficiency also increases from 83.8% to 93.2%. The corresponding differential capacity vs. voltage (dQ/dV) curves are plotted in FIG. 13B. At all tested rates, the GSIR LR-NCM exhibits a higher capacity than that of the pristine LR-NCM. Additional testing showed that the GSIR LR-NCM delivers a higher discharge-capacity of 298 mAh $g^{-1}$ when it returns to the 0.1 C-rate, compared to that of 288 mAh $g^{-1}$ for the pristine LR-NCM. Moreover, the GSIR LR-NCM demonstrate a slight degradation in potential after 100 cycles, even for a discharge capacity as high as 300 mAh $g^{-1}$.

While specific embodiments of the present invention have been shown and described above and the attachment following the claims, it should be understood that other modifications, substitutions and alternatives are apparent to one of ordinary skill in the art. Such modifications, substitutions and alternatives can be made without departing from the spirit and scope of the invention.

Various features of the invention are set forth in the appended claims.

The invention claimed is:

1. A lithium-excess cathode material comprising $Li_{1+x}Ni_aMn_bCo_cMo_dO_{2-y}$, ($0<x<0.3$, $0\le a\le 1$, $0\le b\le 1$, $0\le c\le 1$, $0\le d\le 0.2$, $0\le y\le 0.25$) in the form of secondary spherical microparticles having an average diameter of 2-3 μm formed from primary spherical nanoparticles having diameters in the range of 130 nm to 200 nm.

2. The material of claim 1, further comprising excess oxygen vacancies in the material.

3. The material of claim 1, comprising $Li_{1.2}Ni_{0.2}Mn_{0.6}O_2$.

4. The material of claim 1, comprising $Li_{1.2}N_{0.136}Mn_{0.544}Co_{0.136}O_2$.

5. The material of claim 1, comprising $Li_{1.1}Ni_{0.2}Mn_{0.6}O_{1.95}$.

6. The material of claim 1, comprising $Li_{1.13}Ni_{0.3}Mn_{0.57}O_2$.

7. The material of claim 1, comprising $Li_{1.144}Ni_{0.136}Co_{0.136}Mn_{0.544}O_{1.92}$.

8. The material of claim 1, comprising $Li_{1.18}Ni_{0.135}Co_{0.135}Mn_{0.539}Mo_{0.01}O_2$.

9. The material of claim 1, further comprising a lithium lanthanum titanium oxide coating.

10. The material of claim 1, as part of a cathode in a lithium ion battery.

11. The electrode material of claim 1 where $0<x<0.3$, $0\le a\le 1$, $0\le b\le 1$, $0\le c\le 1$, $0\le d\le 0.2$, $0\le y\le 0.25$.

12. A method for forming morphology controlled lithium-excess cathode material, comprising:
mixing a carbonates or hydroxides solution into a mixed solution of transition metal (M) ions with predetermined stoichiometry under stirring to create a slurry of primary metal carbonate or metal hydroxide nanoparticles having diameters in the range of 130 nm to 200 nm;
transferring the slurry to an ageing vessel;
aging the slurry at temperature ranging from 40° C. to 80° C. for 2 to 20 hours to produce secondary microparticles having an average diameter of 2-3 μm or smaller;
washing and then drying a resulting powder;
mixing the powder with a stoichiometric amount of lithium carbonate or lithium hydroxide;
calcinating the mixture to produce the morphology controlled lithium-excess cathode material.

13. The method of claim 12, wherein said resulting powder comprises $Li_{1.2}Ni_{0.2}Mn_{0.6}O_2$ (0.5 $LiNi_{0.5}Mn_{0.5}O_2.0.5\ Li_2MnO_3$).

14. The method of claim 12, further comprising coating the mixture with a lithium lanthanum titanium oxide coating.

15. The method of claim 12, further comprising introducing oxygen vacancies into the morphology controlled lithium-excess cathode material via gas solid interfacial modification.

16. The method of claim 15, wherein said gas solid interfacial modification comprises placing the lithium-excess cathode material and a $CO_2$ precursor separate from each other and heating to induce the gas solid interfacial modification and create excess oxygen vacancy morphology controlled lithium-excess cathode material.

17. The method of claim 16, wherein the $CO_2$ precursor comprises $NH_4HCO_3$.

18. The method of claim 17, further comprising washing the oxygen vacancy morphology controlled lithium-excess cathode material.

19. The method of claim 12, wherein the ageing vessel comprises an autoclave and the ageing is conducted without stirring.

20. The method of claim 12, wherein the ageing is conducted at a temperature ranging from 70 to 80° C. for 10 to 15 hours.

* * * * *